United States Patent
Ono

(10) Patent No.: US 10,795,514 B2
(45) Date of Patent: Oct. 6, 2020

(54) DISPLAY DEVICE HAVING TOUCH DETECTION FUNCTION

(71) Applicant: Panasonic Liquid Crystal Display Co., Ltd., Himeji-shi, Hyogo (JP)

(72) Inventor: Kikuo Ono, Ibaraki (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 53 days.

(21) Appl. No.: 15/873,367

(22) Filed: Jan. 17, 2018

(65) Prior Publication Data

US 2018/0143711 A1 May 24, 2018

Related U.S. Application Data

(63) Continuation of application No. PCT/JP2016/003188, filed on Jul. 4, 2016.

(30) Foreign Application Priority Data

Jul. 17, 2015 (JP) .................................. 2015-143243

(51) Int. Cl.
*G06F 3/041* (2006.01)
*G06F 3/044* (2006.01)
*G02F 1/1362* (2006.01)
*G02F 1/1333* (2006.01)
(Continued)

(52) U.S. Cl.
CPC ............ *G06F 3/044* (2013.01); *G02F 1/1362* (2013.01); *G02F 1/13338* (2013.01); *G02F 1/13439* (2013.01); *G02F 1/133345* (2013.01); *G02F 1/133512* (2013.01); *G02F 1/133514* (2013.01); *G02F 1/136286* (2013.01); *G06F 3/0412* (2013.01); *G02F 2001/13629* (2013.01); *G02F 2001/133302* (2013.01); *G02F 2001/133388* (2013.01); *G02F 2001/133562* (2013.01); *G02F 2201/121* (2013.01); *G02F 2201/123* (2013.01);
(Continued)

(58) Field of Classification Search
CPC .......... G06F 3/041; G06F 3/045; G06F 3/038; G01R 27/26; G09G 5/00; G06K 11/06; G08C 21/00
See application file for complete search history.

(56) References Cited

U.S. PATENT DOCUMENTS 5,392,058 A 2/1995 Tagawa
5,581,274 A 12/1996 Tagawa
(Continued)

FOREIGN PATENT DOCUMENTS

JP 4-337824 11/1992
JP 2009-244958 10/2009
(Continued)

*Primary Examiner* — Pegeman Karimi
(74) *Attorney, Agent, or Firm* — Hamre, Schumann, Mueller & Larson, P.C.

(57) ABSTRACT

A display device with a touch detection function includes a first substrate including a plurality of gate lines, a plurality of data lines, a plurality of pixel electrodes, and a plurality of touch sensor electrodes; and a second substrate that is disposed opposite the first substrate. The first substrate is disposed on a touch operation side with respect to the second substrate, and a part of the plurality of touch sensor electrodes is disposed in a peripheral region located outside an image display region.

3 Claims, 34 Drawing Sheets

(51) Int. Cl.
*G02F 1/1335* (2006.01)
*G02F 1/1343* (2006.01)

(52) U.S. Cl.
CPC .............. *G06F 2203/04103* (2013.01); *G06F 2203/04107* (2013.01); *G06F 2203/04111* (2013.01)

(56) References Cited

U.S. PATENT DOCUMENTS

| | | | |
|---|---|---|---|
| 2007/0153173 A1* | 7/2007 | Lee | G02F 1/133555 349/114 |
| 2010/0182273 A1 | 7/2010 | Noguchi et al. | |
| 2012/0062486 A1* | 3/2012 | Rho | G06F 3/041 345/173 |
| 2012/0075238 A1 | 3/2012 | Minami et al. | |
| 2012/0162104 A1 | 6/2012 | Chang et al. | |
| 2012/0162584 A1 | 6/2012 | Chang et al. | |
| 2012/0218199 A1* | 8/2012 | Kim | G06F 3/0412 345/173 |
| 2013/0271689 A1 | 10/2013 | Kim et al. | |
| 2014/0146013 A1 | 5/2014 | Noguchi et al. | |
| 2014/0292718 A1 | 10/2014 | Noguchi et al. | |
| 2015/0022497 A1 | 1/2015 | Chang et al. | |
| 2015/0192815 A1 | 7/2015 | Chang et al. | |
| 2015/0199057 A1 | 7/2015 | Minami et al. | |
| 2015/0236047 A1 | 8/2015 | Kim et al. | |
| 2015/0370378 A1 | 12/2015 | Chang et al. | |
| 2016/0187694 A1* | 6/2016 | Kim | G06F 3/0412 349/12 |
| 2016/0202819 A1* | 7/2016 | Chen | G06F 3/0412 345/174 |
| 2016/0252785 A1* | 9/2016 | Kimura | G02F 1/13338 349/12 |
| 2016/0253030 A1 | 9/2016 | Tada et al. | |
| 2016/0291756 A1* | 10/2016 | Li | G06F 3/0412 |
| 2016/0342255 A1 | 11/2016 | Noguchi et al. | |
| 2017/0269738 A1 | 9/2017 | Chang et al. | |
| 2018/0067592 A1* | 3/2018 | Kimura | G02F 1/1343 |

FOREIGN PATENT DOCUMENTS

| | | |
|---|---|---|
| JP | 2012-073783 | 4/2012 |
| JP | 2013-222202 | 10/2013 |
| JP | 2014-206984 | 10/2014 |
| WO | 2015/059995 | 4/2015 |

* cited by examiner

DISPLAY DEVICE HAVING TOUCH DETECTION FUNCTION

CROSS-REFERENCE TO RELATED APPLICATION

This application is a bypass continuation of international patent application PCT/JP2016/003188, filed on Jul. 4, 2016 designating the United States of America. Priority is claimed based on a Japanese patent application JP2015-143243, filed on Jul. 17, 2015. The entire disclosures of these international and Japanese patent applications are incorporated herein by reference in their entirety.

TECHNICAL FIELD

The present disclosure relates to a drive circuit and a display device provided with the drive circuit.

BACKGROUND

Conventionally, various display devices with a touch panel have been proposed. Recently, what is called an in-cell type display device with a touch detection function in which a function of the touch panel is incorporated in the display panel is proposed in order to achieve a low profile of a whole display device (for example, see Japanese Unexamined Patent Application Publication No. 2014-206984). In the display device in the prior art, a touch detection electrode is provided in a first substrate (TFT substrate) disposed on a backlight side, and a touch position is detected based on a change in electrostatic capacitance between the electrode and a finger when the display panel is touched from a display surface side on which a second substrate (CF substrate) is disposed.

However, in the conventional technology, the touch detection electrode is disposed in an image display region, but not disposed in a peripheral region outside the image display region, which results in a problem in that touch detection accuracy is low at an end of the image display region and in the peripheral region.

The present disclosure has been made in view of the above problem, and an object thereof is to provide a display device with a touch detection function, which can detect the touch position even in the peripheral region.

SUMMARY

In one general aspect, the instant application describes a display device with a touch detection function includes a first substrate including a plurality of gate lines, a plurality of data lines, a plurality of pixel electrodes, and a plurality of touch sensor electrodes; and a second substrate that is disposed opposite the first substrate. The first substrate is disposed on a touch operation side with respect to the second substrate, and a part of the plurality of touch sensor electrodes is disposed in a peripheral region located outside an image display region.

The above general aspect may include one or more of the following features.

The plurality of touch sensor electrodes disposed at an end of the image display region in the plurality of touch sensor electrodes may be disposed across the image display region and the peripheral region.

In the first substrate, the plurality of touch sensor electrodes may be disposed on the touch operation side with respect to the plurality of gate lines, the plurality of data lines, and the plurality of pixel electrodes.

In planar view, a first boundary of two of the touch sensor electrodes adjacent to each other in a direction in which the gate line extends may be disposed at a position where the first boundary does not overlap the data line. A second boundary of two of the touch sensor electrodes adjacent to each other in a direction in which the data line extends may be disposed at a position where the second boundary does not overlap the gate line.

The first substrate may further include a common electrode that is disposed opposite the plurality of pixel electrodes. In planar view, the first boundary and the second boundary in the touch sensor electrode may be covered with the common electrode.

The first substrate may further include a plurality of touch sensor electrode lines electrically connected to the plurality of touch sensor electrodes. One of the touch sensor electrode lines may be electrically connected to one of the touch sensor electrodes through an insulator.

The plurality of pixel electrodes may be divided into a plurality of groups. One of the touch sensor electrodes may be disposed at a ratio of one with respect to the plurality of pixel electrodes included in one of the plurality of groups.

The plurality of touch sensor electrodes may be made of a metallic material having a light shielding property. In planar view, the plurality of touch sensor electrodes may be disposed so as to overlap the plurality of gate lines and the plurality of data lines, and an opening is formed at a position overlapping the plurality of pixel electrodes.

The plurality of touch sensor electrodes may be made of a transparent electrode material.

The plurality of touch sensor electrodes may include a plurality of first touch sensor electrodes made of a metallic material having a light shielding property and a plurality of second touch sensor electrodes made of a transparent electrode material. In planar view, the plurality of first touch sensor electrodes may be disposed so as to overlap the plurality of gate lines and the plurality of data lines, and an opening is formed at a position overlapping the plurality of pixel electrodes. In planar view, each of the second touch sensor electrodes may be disposed so as to cover each of the first touch sensor electrodes.

The first substrate may further include a plurality of common electrodes that are disposed opposite the plurality of pixel electrodes. One of the common electrodes may be electrically connected to one of the touch sensor electrodes through an insulator.

In planar view, a boundary of two of the common electrodes adjacent to each other in a direction in which the gate line extends may be disposed at a position overlapping the data line. A boundary of two of the common electrodes adjacent to each other in a direction in which the data line extends may be disposed at a position overlapping the gate line.

The first substrate may further include a color filter.

The plurality of touch sensor electrodes may be formed on a glass substrate in the image display region and the peripheral region. A first insulator may be formed so as to cover the plurality of touch sensor electrodes. The plurality of gate lines may be formed on the first insulator. A second insulator may be formed so as to cover the plurality of gate lines. The plurality of data lines may be formed on the second insulator. A third insulator may be formed so as to cover the plurality of data lines. The plurality of pixel electrodes may be formed on the third insulator.

A plurality of lead lines electrically connected to the plurality of gate lines may be formed on the first insulator in the peripheral region.

The display device with the touch detection function may further include a backlight. The second substrate may be disposed on a side of the backlight with respect to the first substrate.

The peripheral region may include a driving circuit region where a driving circuit that outputs a gate signal to each of the plurality of gate lines is disposed. A part of the plurality of touch sensor electrodes may overlap the driving circuit region in planar view.

In the configuration of display device with the touch detection function of the present disclosure, the touch position can be detected even in the peripheral region.

DETAILED DESCRIPTION

An embodiment of the present application is described below with reference to the drawings. The embodiment of the present application takes a liquid crystal display device as an example of a display device of the present application. However, the present application is not limited thereto.

Figure 1:
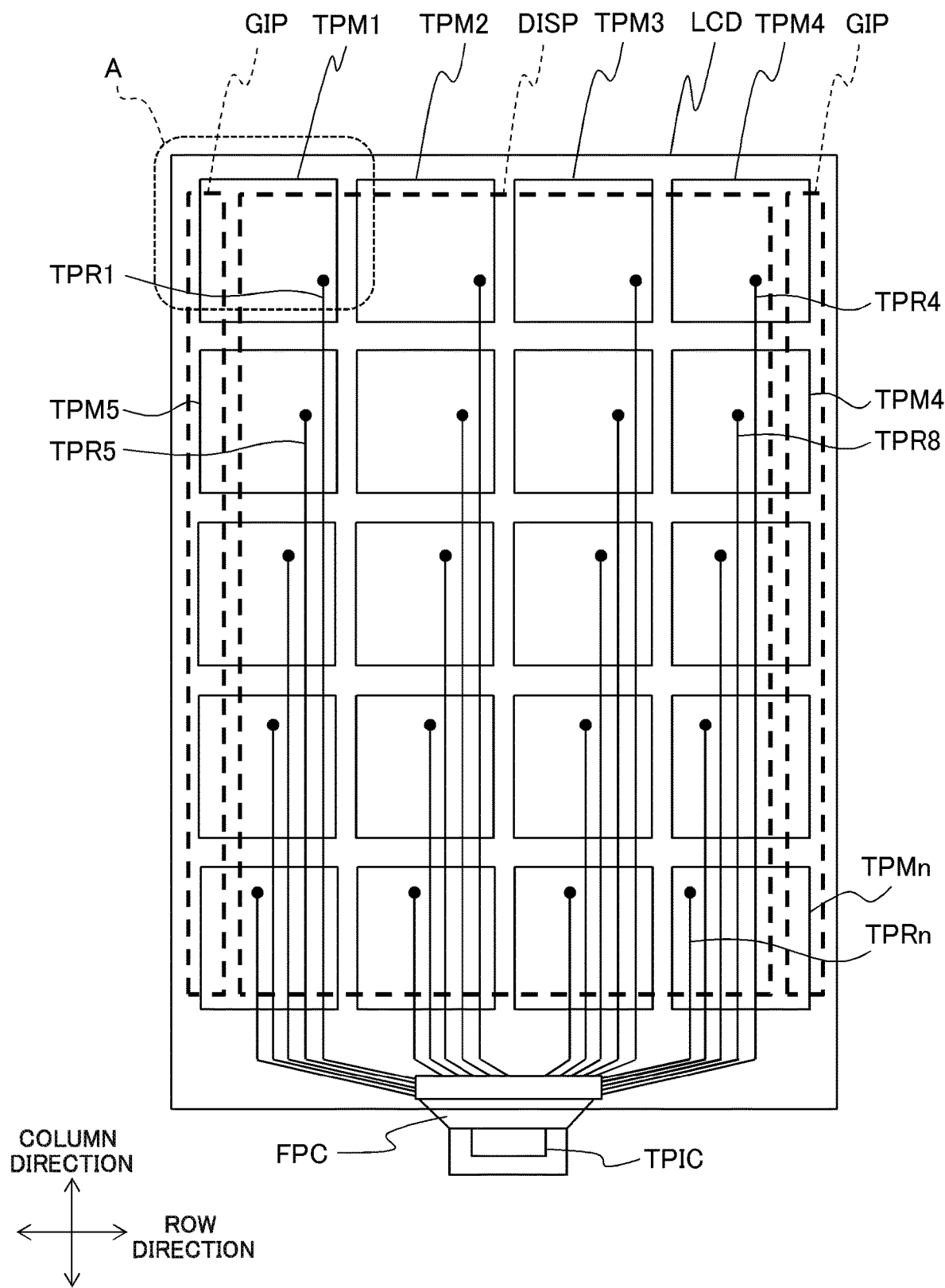
FIG. 1 is a plan view schematically illustrating an entire configuration of a liquid crystal display device according to the exemplary embodiment.

FIG. 1 is a plan view schematically illustrating an entire configuration of a liquid crystal display device according to the exemplary embodiment. A plane region constituting liquid crystal display device LCD includes image display region DISP and a peripheral region except for image display region DISP. For example, the peripheral region includes a circuit (such as a shift register circuit) that supplies a gate signal to a gate line, a lead line connected to the circuit, driving circuit region GIP where a protective circuit and the like are disposed, a region where the circuit and a wiring are not disposed, and what is called a frame region. Driving circuit region GIP is cited below as an example of the peripheral region. The plane region includes a plurality of touch electrode regions TPM arranged into a matrix shape in row and column directions. It is assumed that the row direction is a direction in which the gate line extends and that the column direction is a direction in which a data line extends. The plurality of touch electrode regions TPM are arranged while electrically separated from each other. There is no limitation on a number of touch electrode regions TPM. Touch electrode region TPM disposed at an end is disposed so as to overlap driving circuit region GIP.

Liquid crystal display device LCD includes a plurality of touch panel driving wirings TPR, touch panel driver TPIC, flexible board FPC, and a display driver (a gate driver, a source driver, and a common driver) (not illustrated). Each touch panel driving wiring TPR (touch sensor electrode line) extends to each touch electrode region TPM, and is electrically connected to a touch panel electrode (touch sensor electrode) (to be described later). At least one touch panel driving wiring TPR is electrically connected to the touch panel electrode of one touch electrode region TPM. Each touch panel driving wiring TPR may be formed with an identical length in image display region DISP.

A specific configuration of liquid crystal display device LCD will be described below with reference to the drawings. In the following drawings, a common configuration is designated by an identical numeral, and the description is omitted as appropriate.

First Exemplary Embodiment

Figure 2:
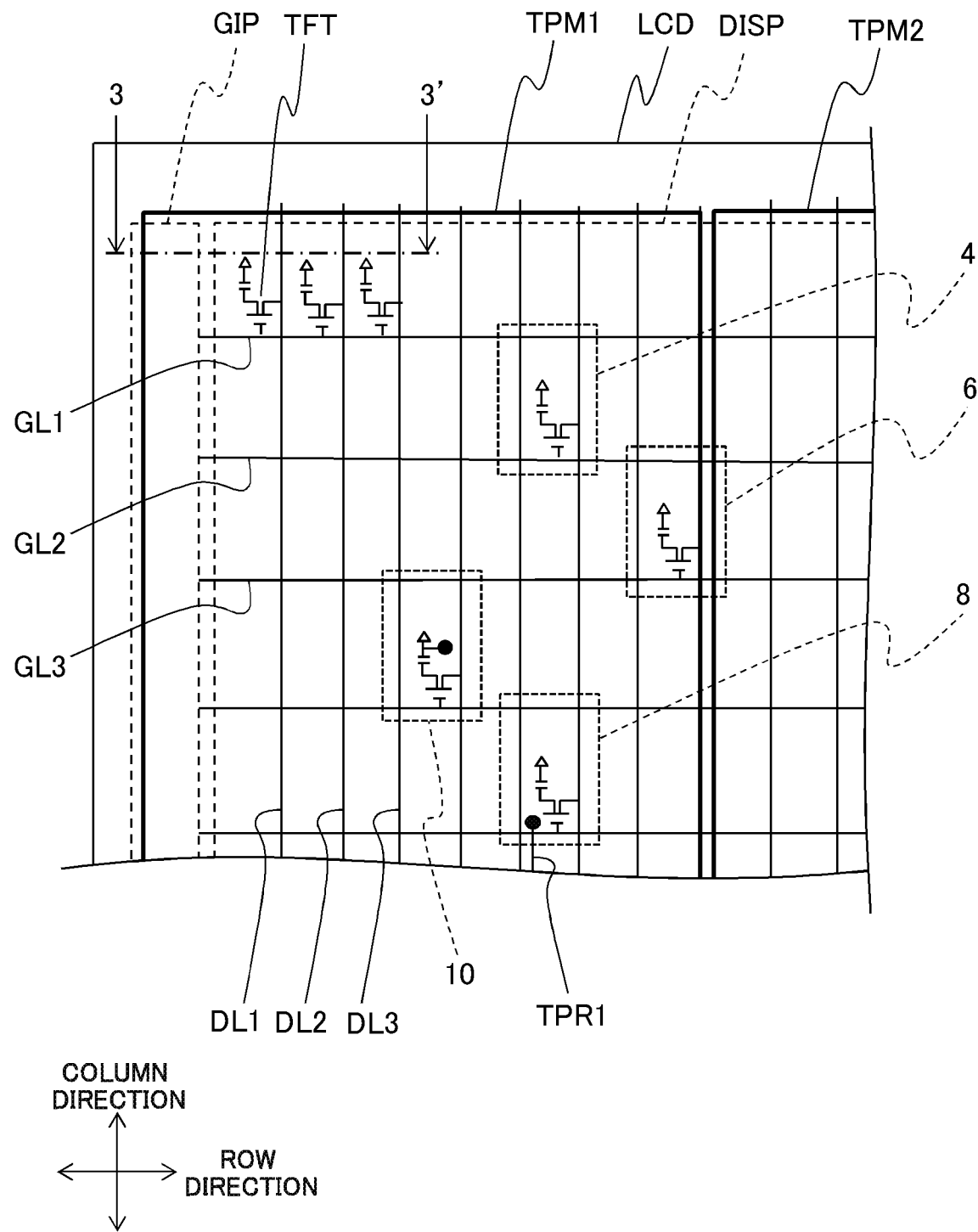
FIG. 2 is an enlarged plane view illustrating a range indicated by a sign "A" in FIG. 1 in liquid crystal display device LCD according to a first exemplary embodiment.

FIG. 2 is an enlarged plane view illustrating a range indicated by a sign "A" in FIG. 1 in liquid crystal display device LCD according to a first exemplary embodiment. A plurality of data lines DL extending in the column direction and a plurality of gate lines GL extending in the row direction are provided in image display region DISP. The plurality of data lines DL are arranged at substantially equal intervals in the row direction, and the plurality of gate lines GL are arranged at substantially equal intervals in the column direction. Touch panel driving wiring TPR is disposed so as to overlap data line DL in planar view. In FIG. 2, for convenience, touch panel driving wiring TPR and data line DL are illustrated while deviating from each other. Thin film transistor TFT is provided at each intersection point of data line DL and gate line GL. A region partitioned by two adjacent data lines DL and two adjacent gate lines GL constitutes one pixel region. Each touch electrode region TPM includes a plurality of pixel regions. A plurality of pixel electrodes are divided into a plurality of groups, and one touch electrode region TPM and one touch panel electrode are disposed at a ratio of one with respect to the plurality of pixel electrodes included in one group. Touch electrode region TPM (for example, touch electrode region TPM1) disposed at the end is disposed so as to overlap driving circuit region GIP. Two touch electrode regions TPM adjacent to each other in the row direction are electrically separated from each other. Two touch electrode regions TPM adjacent to each other in the column direction are electrically separated from each other.

Figure 3:
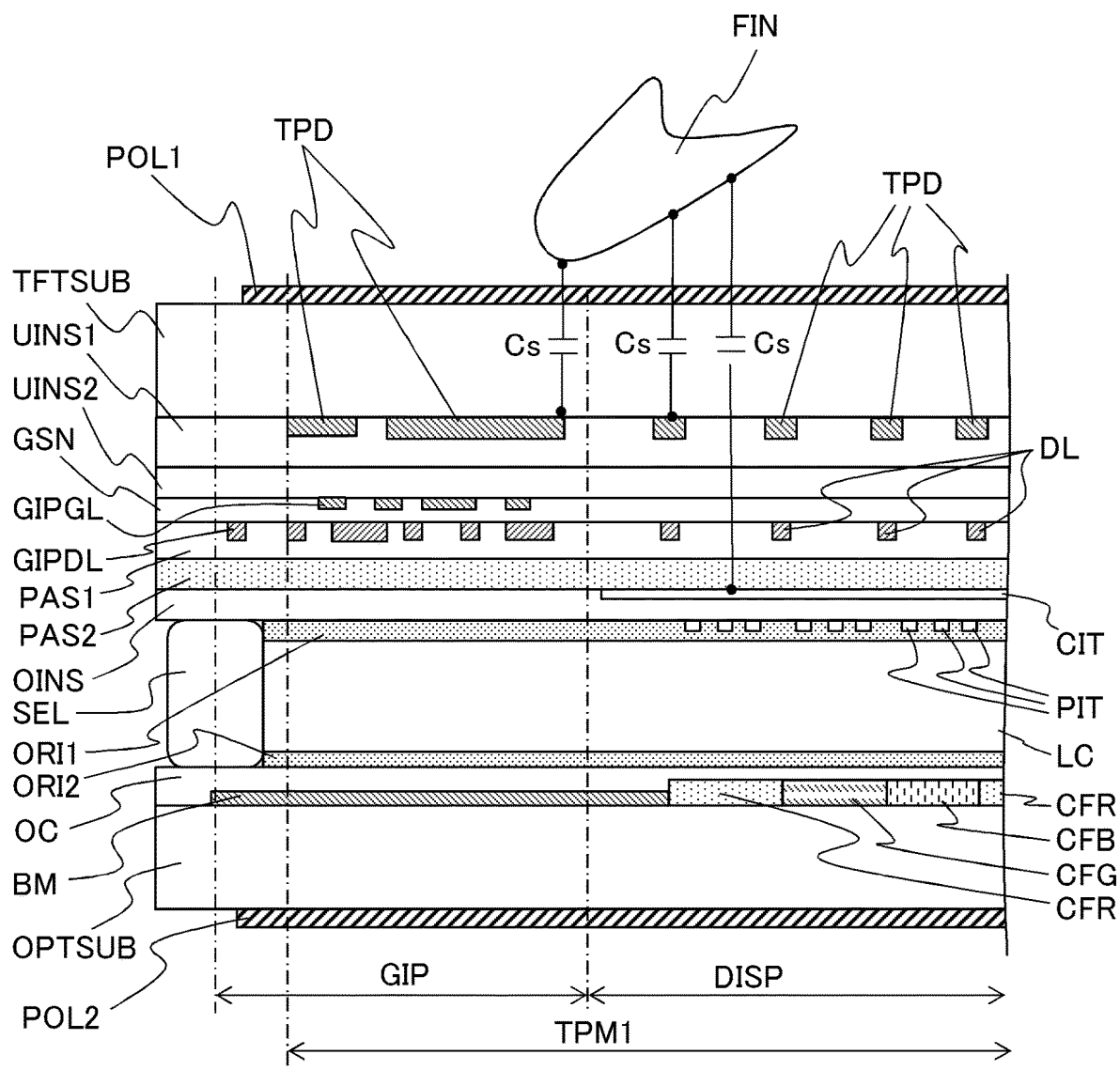
FIG. 3 is a sectional view of a part taken along line 3-3' in FIG. 2.

FIG. 3 is a sectional view of a part taken along line 3-3' in FIG. 2. FIG. 3 illustrates image display region DISP including three pixel regions and driving circuit region GIP. Liquid crystal display device LCD includes a thin film transistor substrate (TFT substrate; first substrate), a color filter substrate (CF substrate; second substrate), and liquid crystal layer LC sandwiched between the TFT substrate and the CF substrate. A backlight (not illustrated) is disposed on a rear surface side of the CF substrate. Positive-type liquid crystal molecules (not illustrated) in which major axes of liquid crystal molecules are aligned along an electric field direction are sealed in liquid crystal layer LC.

Touch panel electrode TPD is formed on glass substrate TFTSUB constituting the TFT substrate, and first insulator UINS1 and second insulator UINS2 are formed so as to cover touch panel electrode TPD. Touch panel electrode TPD is made of a metallic material having a light shielding property. Gate lead line GIPGL for the shift register circuit is formed on second insulator UINS2 in driving circuit region GIP, and gate insulator GSN is formed so as to cover gate lead line GIPGL. Drain lead line GIPDL for the shift register circuit is formed on gate insulator GSN in driving circuit region GIP, and first protective film PAS1 and second protective film PAS2 are formed so as to cover drain lead line GIPDL. Data line DL is formed on gate insulator GSN in image display region DISP, and first protective film PAS1 and second protective film PAS2 are formed so as to cover data line DL. In image display region DISP, data line DL is disposed so as to overlap touch panel electrode TPD in planar view. Common electrode CIT made of a transparent electrode material ITO (Indium Tin Oxide) is formed on second protective film PAS2 in image display region DISP, and interlayer insulator OINS is formed so as to cover common electrode CIT. Common electrode CIT is separately formed in image display region DISP of each touch electrode region TPM. Pixel electrode PIT made of ITO is formed on interlayer insulator OINS in image display region DISP, and alignment film ORI1 is formed so as to cover pixel electrode PIT. A plurality of slits are formed in pixel electrode PIT. Polarizing plate POL1 is formed on the display surface side of glass substrate TFTSUB.

Black matrix BM, red color filter CFR, green color filter CFG, and blue color filter CFB are formed on glass substrate OPTSUB constituting the CF substrate, and overcoat film OC is formed so as to cover black matrix BM, red color filter CFR, green color filter CFG, and blue color filter CFB. Alignment film ORI2 is formed on overcoat film OC. Polarizing plate POL2 is formed on the rear surface side (backlight side) of glass substrate OPTSUB. The TFT substrate and the CF substrate are bonded to each other by sealing material SEL.

Figure 4:
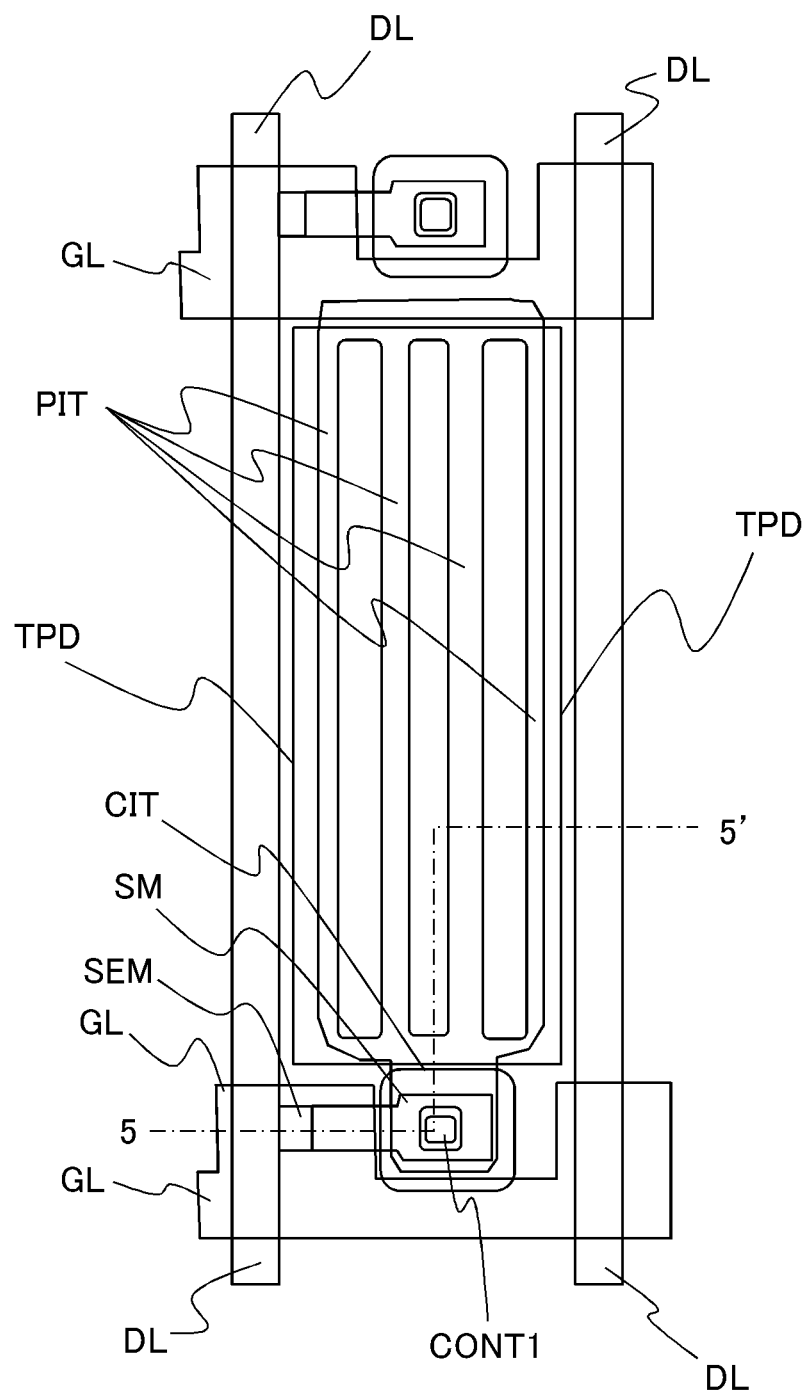
FIG. 4 is an enlarged plan view illustrating a range indicated by a sign "4" in FIG. 2.

FIG. 4 is an enlarged plan view illustrating a range indicated by a sign "4" in FIG. 2. FIG. 4 illustrates one pixel region. FIG. 4 illustrates a plane pattern of the TFT substrate. The plane pattern of the TFT substrate is also illustrated in the following drawings illustrating the pixel region.

Pixel electrode PIT is formed between two adjacent gate lines GL and between two adjacent data lines DL. The plurality of slits (openings) are formed in pixel electrode PIT. Common electrode CIT is formed in common among the plurality of pixel regions in touch electrode region TPM. A part of data line DL and a part of source electrode SM of thin film transistor TFT overlap semiconductor layer SEM in planar view. Pixel electrode PIT is electrically connected to source electrode SM through first contact hole CONT1. In order to electrically connect pixel electrode PIT and source electrode SM, an opening is formed in a region where common electrode CIT overlaps first contact hole CONT1 and source electrode SM of thin film transistor TFT. Touch panel electrode TPD is formed so as to overlap gate line GL and data line DL, and an opening is formed in a region surrounded by gate line GL and data line DL. The opening constitutes a transmission region where light of the backlight is transmitted. That is, touch panel electrode TPD is formed into a lattice shape in image display region DISP.

Figure 5:
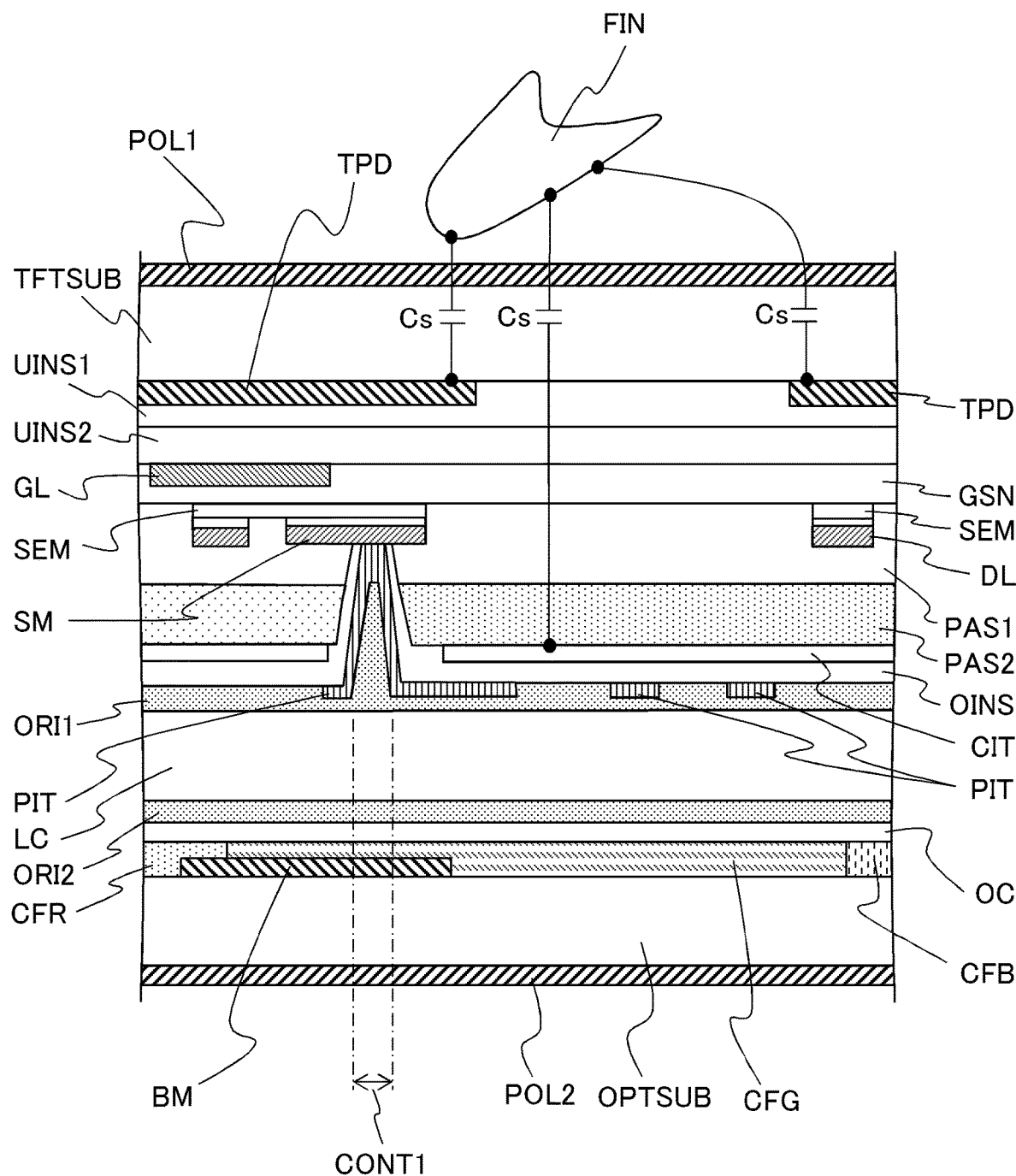
FIG. 5 is a sectional view of a part taken along line 5-5' in FIG. 4.

FIG. 5 is a sectional view of a part taken along line 5-5' in FIG. 4. Gate line GL is formed on second insulator UINS2. Gate line GL and data line DL are disposed so as to overlap touch panel electrode TPD in planar view. Pixel electrode PIT is electrically connected to source electrode SM through first contact hole CONT1 in the opening of common electrode CIT. Black matrix BM is formed in the CF substrate. Black matrix BM acts as a light shielding film that prevents the light of the backlight from being incident on semiconductor layer SEM of thin film transistor TFT. Because touch panel electrode TPD has the light shielding property to act as the black matrix, black matrix BM in the CF substrate needs not to be disposed at a boundary between adjacent color filters CF.

A method for driving liquid crystal display device LCD will briefly be described. Gate line GL is formed by a low-resistance metallic layer, and a scanning gate voltage is applied from a gate driver (not illustrated) to gate line GL. Data line DL is formed by a low-resistance metallic layer, and a video data voltage is applied from a source driver (not illustrated) to data line DL. When a gate-on voltage is applied to gate line GL, semiconductor layer SEM of thin film transistor TFT becomes a low resistance, the data voltage applied to data line DL is transmitted to pixel electrode PIT electrically connected to source electrode SM through source electrode SM formed by the low-resistance metallic layer. A common voltage is applied from a common driver (not illustrated) to common electrode CIT. Common electrode CIT overlaps pixel electrode PIT with interlayer insulator OINS interposed therebetween. Liquid crystal layer LC is driven by a driving electric field from pixel electrode PIT to common electrode CIT through liquid crystal layer LC and the slit of pixel electrode PIT, and an image is displayed. For performing color display, a desired data voltage is applied to data lines DL1(R), DL2(G), DL3(B) connected to pixel electrodes in pixel regions corresponding to red (R), green (G), and blue (B), which are formed by vertical-stripe color filter CF.

Figure 6:
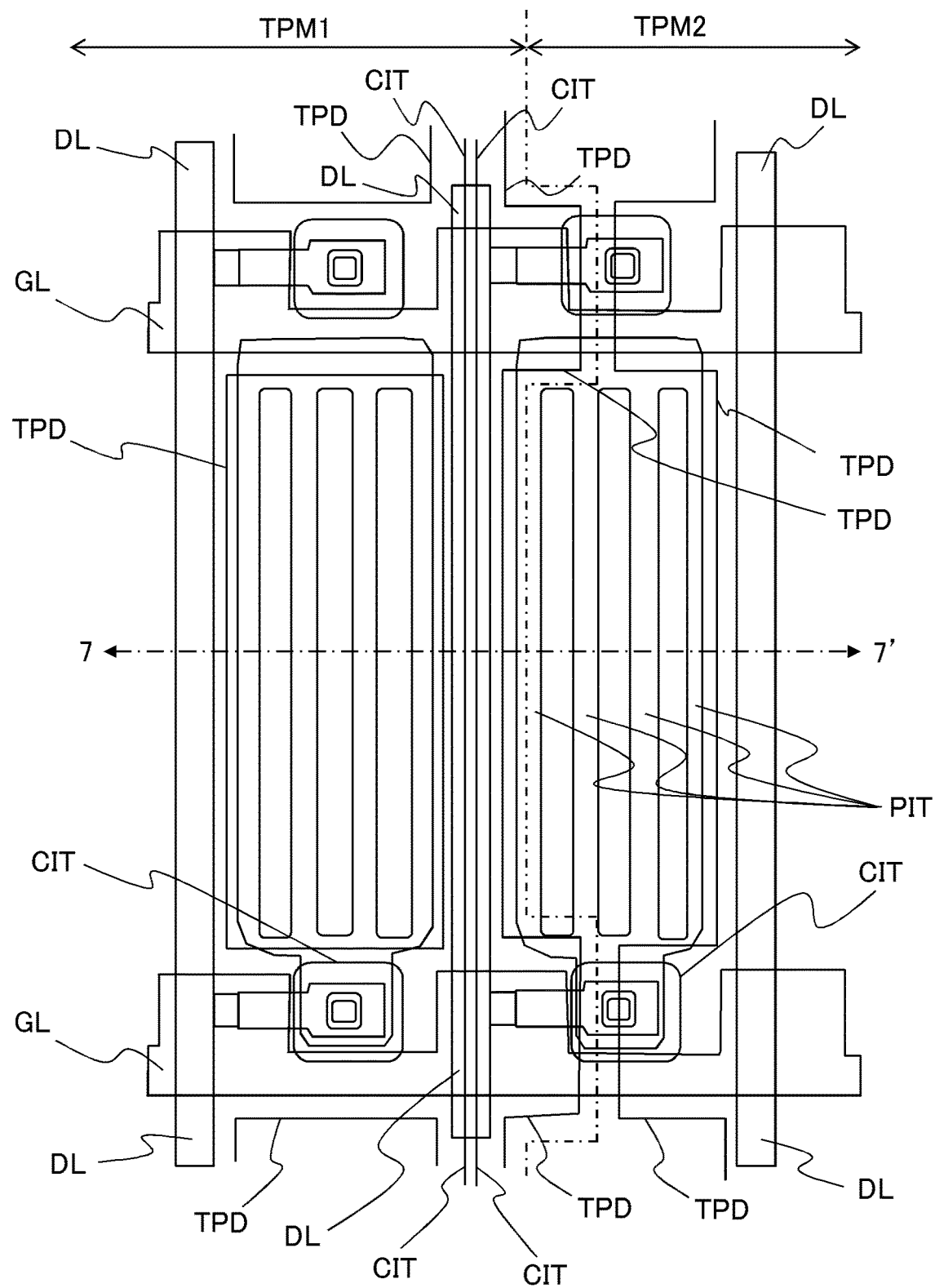
FIG. 6 is an enlarged plan view illustrating a range indicated by a sign "6" in FIG. 2.
Figure 7:
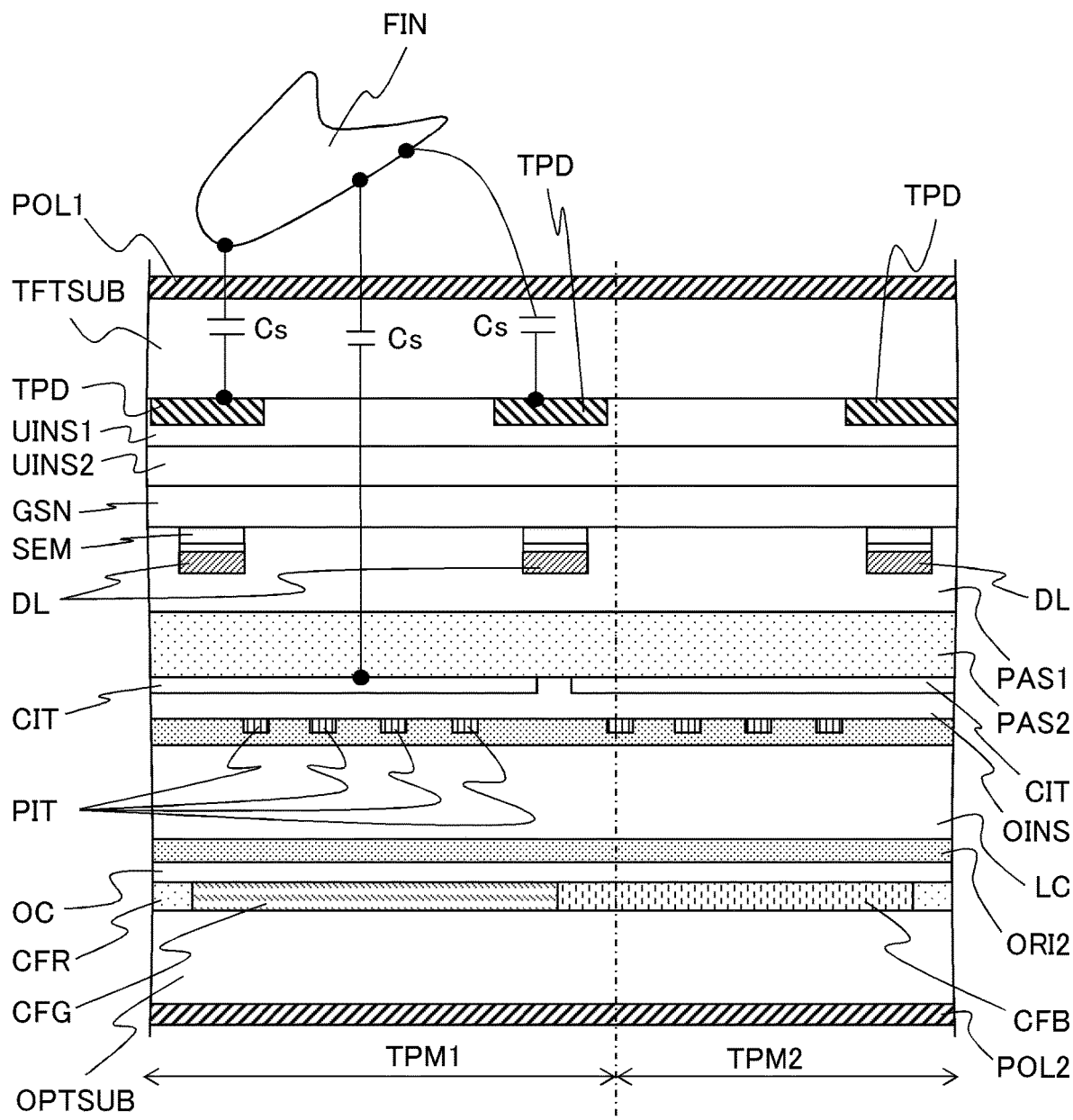
FIG. 7 is a sectional view of a part taken along line 7-7' in FIG. 6.

FIG. 6 is an enlarged plan view illustrating a range indicated by a sign "6" in FIG. 2. FIG. 7 is a sectional view of a part taken along line 7-7' in FIG. 6. FIGS. 6 and 7 illustrate two pixel regions disposed in a boundary portion of adjacent first touch electrode region TPM1 and second touch electrode region TPM2. As illustrated in FIG. 6, touch panel electrode TPD is divided on each gate line GL of a predetermined pixel region. Although not illustrated, touch panel electrode TPD is further divided on each data line DL of a predetermined pixel region. Preferably a boundary (divided position) of two touch panel electrodes TPD adjacent to each other in the row direction is disposed at a position where the boundary does not overlap data line DL, and a boundary (divided position) of two touch panel electrodes TPD adjacent to each other in the column direction is disposed at a position where the boundary does not overlap gate line GL. Therefore, touch panel electrode TPD can be prevented from degrading a function as the black matrix. One touch panel electrode is disposed corresponding to one touch electrode region TPM. Therefore, a plurality of touch panel electrodes TPD, which correspond to a plurality of touch electrode regions TPM and are electrically separated from each other, are formed. One touch panel electrode TPD acts as an electrode (touch sensor electrode) that detects one coordinate.

As illustrated in FIGS. 6 and 7, common electrode CIT is divided on data line DL. Although not illustrated, common electrode CIT is further divided on gate line GL. That is, a boundary of two common electrodes CIT adjacent to each other in the row direction is disposed at a position where the boundary overlaps data line DL, and a boundary of two common electrodes CIT adjacent to each other in the column direction is disposed at a position where the boundary overlaps gate line GL. In common electrode CIT, similarly to touch panel electrode TPD, one common electrode CIT is disposed corresponding to one touch electrode region TPM. Therefore, a plurality of common electrodes CIT, which correspond to the plurality of touch electrode regions TPM and are electrically separated from each other, are formed. One common electrode CIT acts as an electrode (touch sensor electrode) that detects one coordinate.

As illustrated in FIG. 6, the boundary of common electrode CIT is deviated from the boundary of touch panel electrode TPD. Therefore, misalignment between layers can be prevented in a photo process for touch panel electrode TPD and a photo process for common electrode CIT. That is, the boundary of common electrode CIT is easily aligned on data line DL. Because the boundary of touch panel electrode TPD is covered with common electrode CIT, a vicinity of the boundary of touch panel electrode TPD can electrically be shielded, and an influence on display quality can be suppressed. The boundary of common electrode CIT is disposed on data line DL and gate line GL, and the boundary of touch panel electrode TPD is deviated from the boundary of common electrode CIT. Therefore, block-shaped display unevenness of the display panel is suppressed, and a bright display device having a high opening ratio can be fabricated.

Figure 8:
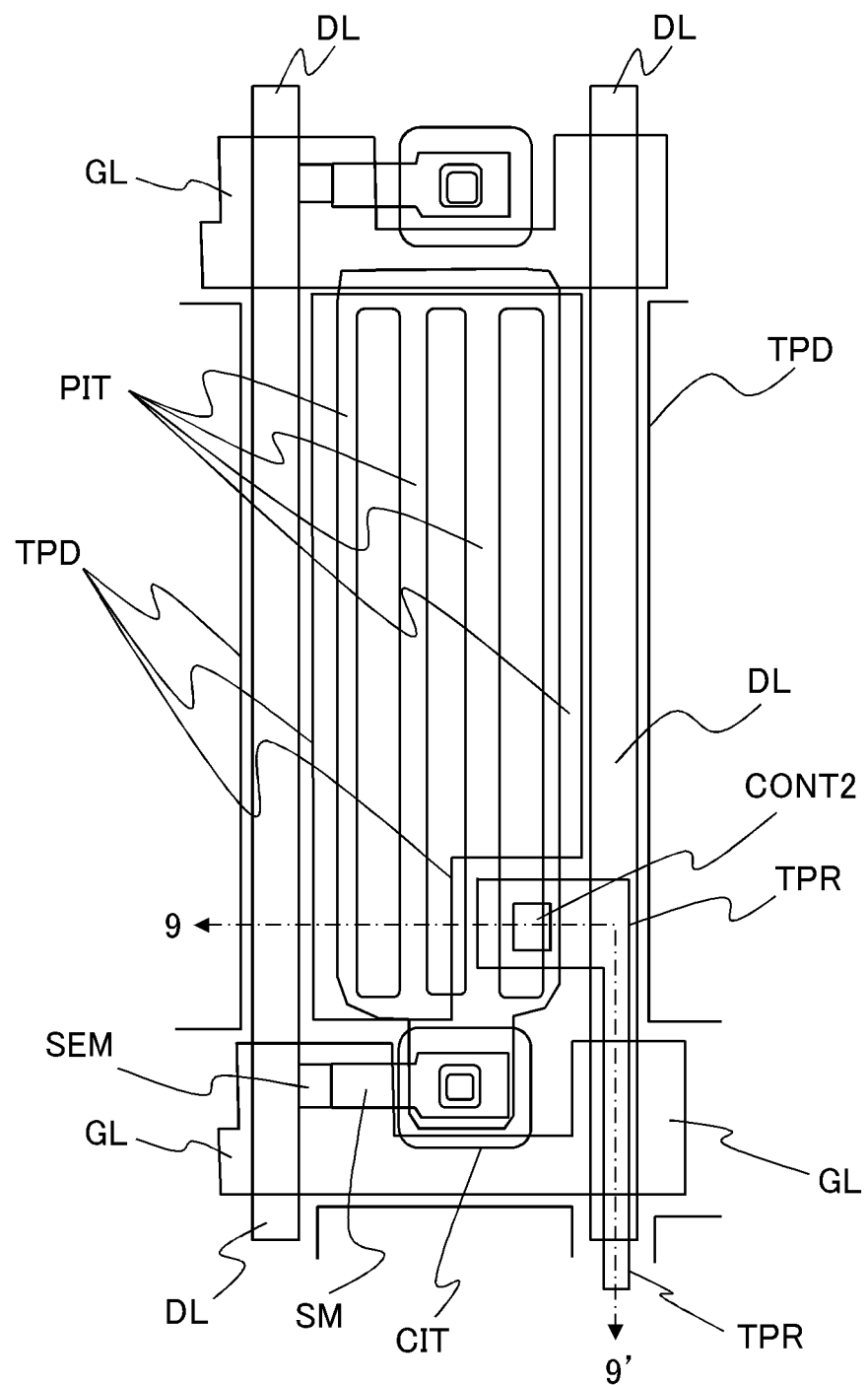
FIG. 8 is an enlarged plan view illustrating a range indicated by a sign "8" in FIG. 2.
Figure 9:
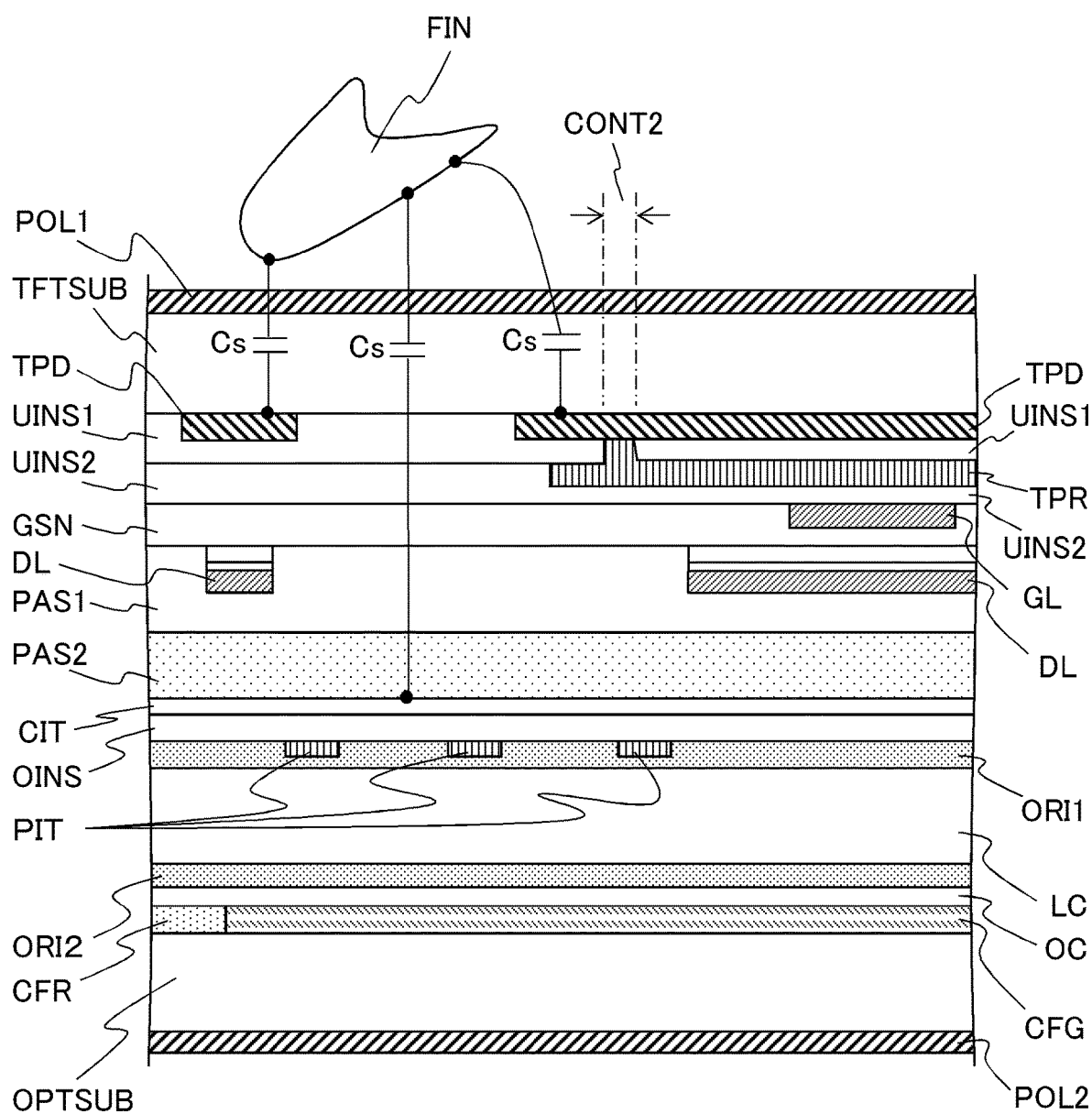
FIG. 9 is a sectional view of a part taken along line 9-9' in FIG. 8.

FIG. 8 is an enlarged plan view illustrating a range indicated by a sign "8" in FIG. 2. FIG. 9 is a sectional view of a part taken along line 9-9' in FIG. 8. FIGS. 8 and 9 illustrates one pixel region. As illustrated in FIG. 8, touch panel driving wiring TPR is disposed so as to overlap data line DL in planar view. As illustrated in FIG. 9, touch panel driving wiring TPR is formed on second insulator UINS2, and electrically connected to touch panel electrode TPD through second contact hole CONT2 made in first insulator UINS1.

At least one touch panel driving wiring TPR is electrically connected to one touch panel electrode TPD in one touch electrode region TPM. For example, the number of touch panel driving wirings TPR electrically connected to touch panel electrode TPD disposed on the side close to touch panel driver TPIC may be smaller than the number of touch panel driving wirings TPR electrically connected to touch panel electrode TPD disposed on the side farther from touch panel driver TPIC. Therefore, wiring resistances of touch panel electrode TPD and common electrode CIT, which are closer to touch panel driver TPIC, and wiring resistances of touch panel electrode TPD and common electrode CIT, which are farther from touch panel driver TPIC, can be homogenized.

Touch panel electrode TPD forms one conductive region in touch electrode region TPM in planar view. However, because the plurality of touch electrode regions TPM are arranged into a matrix shape in an identical plane, touch panel driving wiring TPR cannot be formed by touch panel electrode TPD. For this reason, as illustrated in FIG. 9, a metallic electrode is formed on first insulator UINS1, and used as touch panel driving wiring TPR. Therefore, desired touch panel electrode TPD can electrically be connected without interfering with (electrically connecting) another touch panel electrode TPD. In order to increase a distance between touch panel driving wiring TPR and another touch panel electrode TPD to reduce a parasitic capacitance between touch panel driving wiring TPR and another touch panel electrode TPD, a film thickness of first insulator UINS1 may be increased or touch panel driving wiring TPR may be formed in another layer on the side of liquid crystal layer LC.

Figure 10:
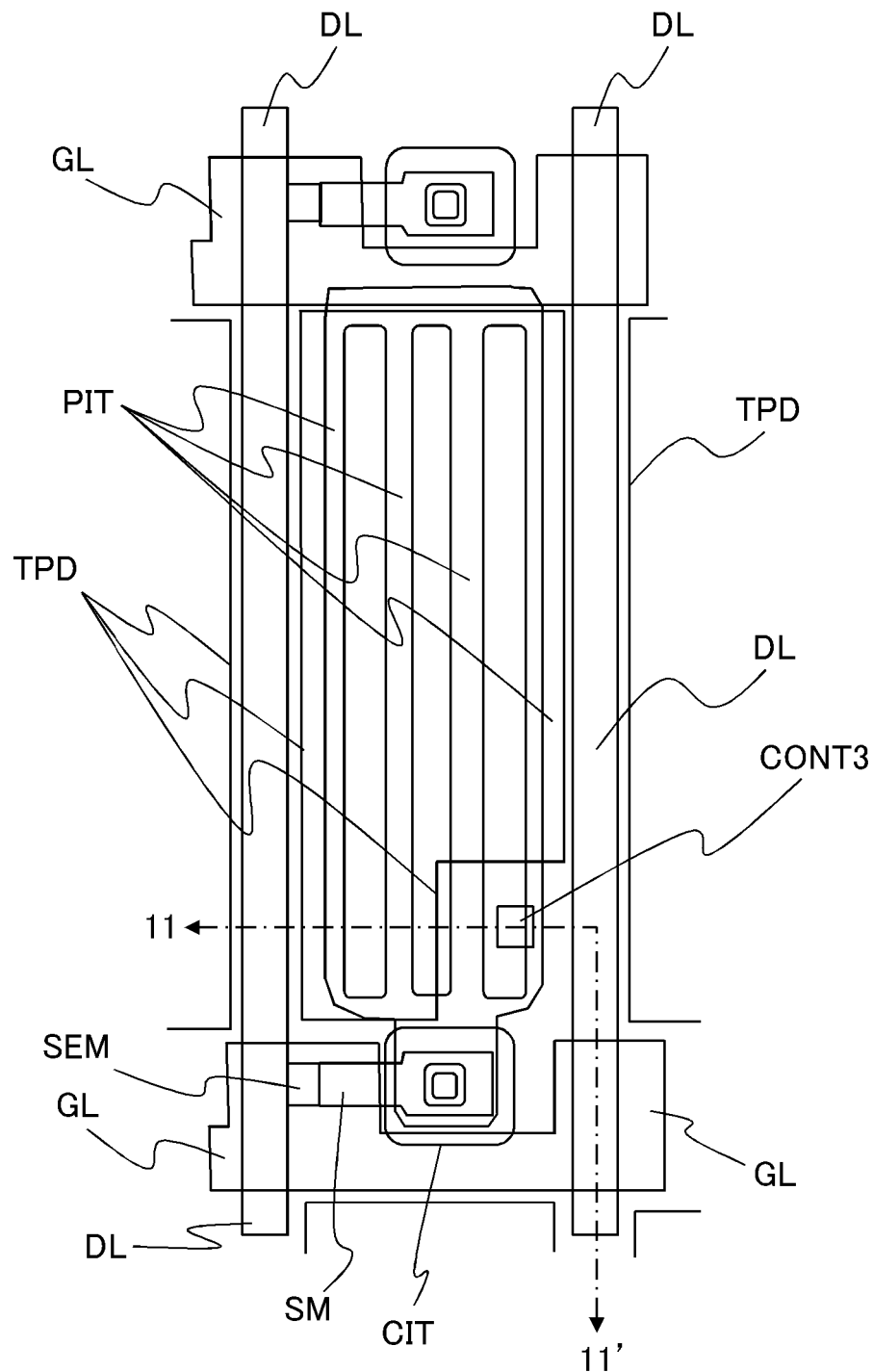
FIG. 10 is an enlarged plan view illustrating a range indicated by a sign "10" in FIG. 2.
Figure 11:
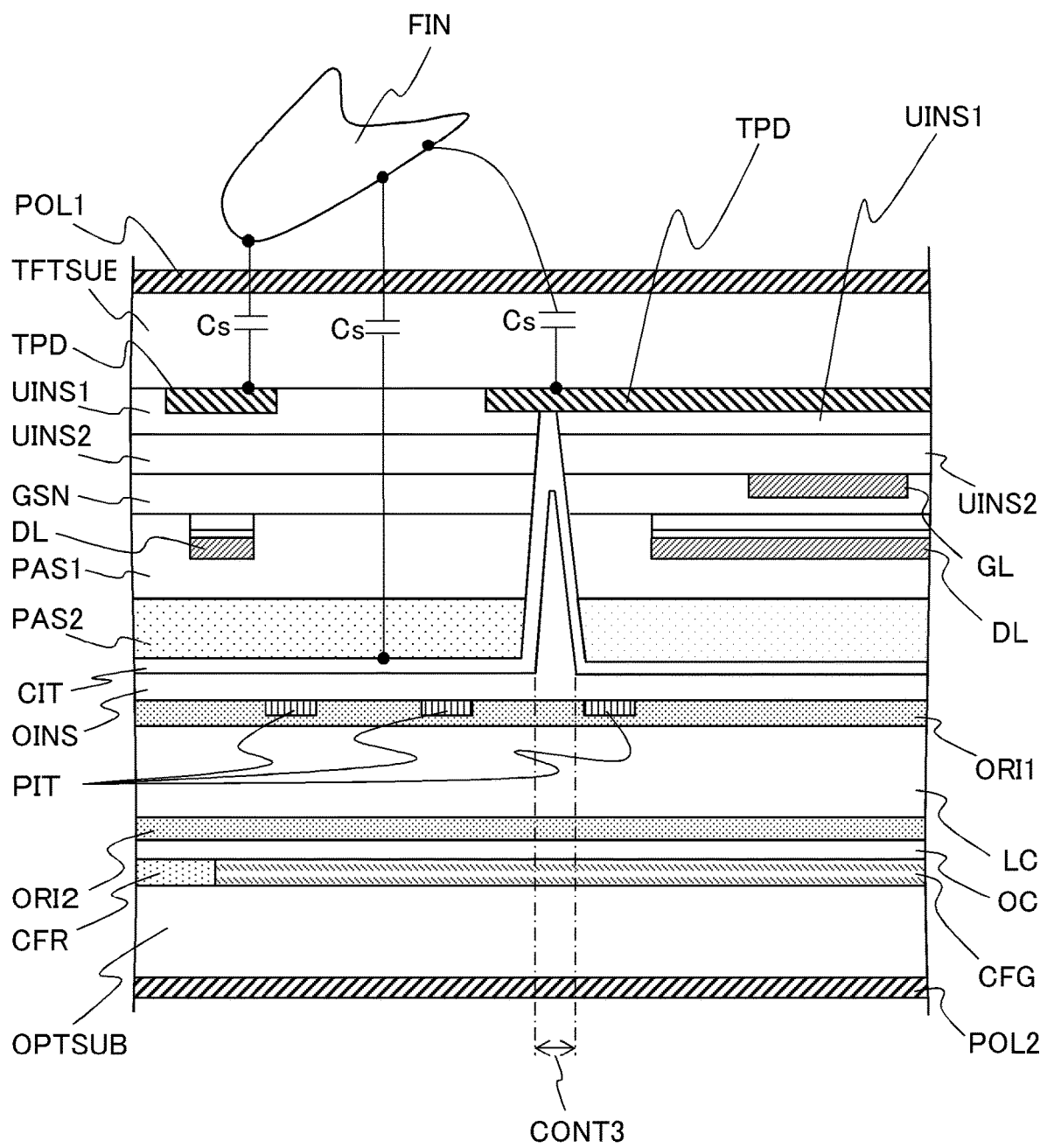
FIG. 11 is a sectional view of a part taken along line 11-11' in FIG. 10.

FIG. 10 is an enlarged plan view illustrating a range indicated by a sign "10" in FIG. 2. FIG. 11 is a sectional view of a part taken along line 11-11' in FIG. 10. FIGS. 10 and 11 illustrate one pixel region. As illustrated in FIG. 11, common electrode CIT is formed on second protective film PAS2, and electrically connected to touch panel electrode TPD through third contact hole CONT3 formed in first insulator UINS1, second insulator UINS2, gate insulator GSN, first protective film PAS1, and second protective film PAS2. One common electrode CIT is electrically connected to touch panel electrode TPD in at least one point in one touch electrode region TPM.

Each common electrode CIT acts as an electrode that displays the image and an electrode (touch sensor electrode) that detects a touch position.

In the configuration of the first exemplary embodiment, when conductor FIN such as a finger comes close to the TFT substrate disposed on the display surface side (touch operation side) of the display panel, an electrostatic capacitance is generated between conductor FIN and both touch panel electrode TPD and common electrode CIT. When the electrostatic capacitance is generated, parasitic capacitance increases in touch panel electrode TPD and common electrode CIT, and current (charge) increases when a touch panel driving voltage is supplied to touch panel electrode TPD and common electrode CIT through touch panel driving wiring TPR (see FIG. 2). Touch panel driver TPIC (see FIG. 1) detects a touch position (coordinate) on the display panel based on a variation amount of the current (charge). When detecting the touch position, liquid crystal display device LCD performs display operation according to the detected touch position. A known method can be adopted to a self-capacitance type touch position detection method. The touch position detection operation may be performed in a non-display period.

At this point, in the conventional configuration, the CF substrate side is the display surface side (touch surface side) to sense a change in electrostatic capacitance Cs between the CF substrate and conductor FIN. In the conventional configuration, in the case where common electrode CIT is used as the touch panel electrode, because gate lead line GIPGL or drain lead line GIPDL are densely disposed in the peripheral region, common electrode CIT cannot be disposed in the peripheral region, but disposed only in image display region DISP.

On the other hand, in the configuration of the first exemplary embodiment, the TFT substrate is disposed on the display surface side (touch surface side), and the change in electrostatic capacitance Cs between the TFT substrate and conductor FIN is sensed with no use of the CF substrate. Touch panel electrode TPD is disposed on the display surface side of gate lead line GIPGL or drain lead line GIPDL in a layer below gate line GL. That is, touch panel electrode TPD is formed in image display region DISP and the peripheral region (including the driving circuit region). Therefore, sensing ability of a command displayed at an end of image display region DISP can be improved because the touch position can be detected even in the peripheral region.

Because touch panel electrode TPD is disposed below (display surface side) gate line GL and data line DL in image display region DISP, the opening ratio is not degraded even if the (opaque) metallic electrode having the light shielding property is used. In image display region DISP, common electrode CIT also has the function of the touch panel electrode. Therefore, detection sensitivity of the touch position can be improved. The display opening does not exist in driving circuit region GIP, but an area of touch panel electrode TPD can largely be taken. Therefore, the good detection sensitivity of the touch position is obtained even if common electrode CIT is not used.

Second Exemplary Embodiment

Figure 12:
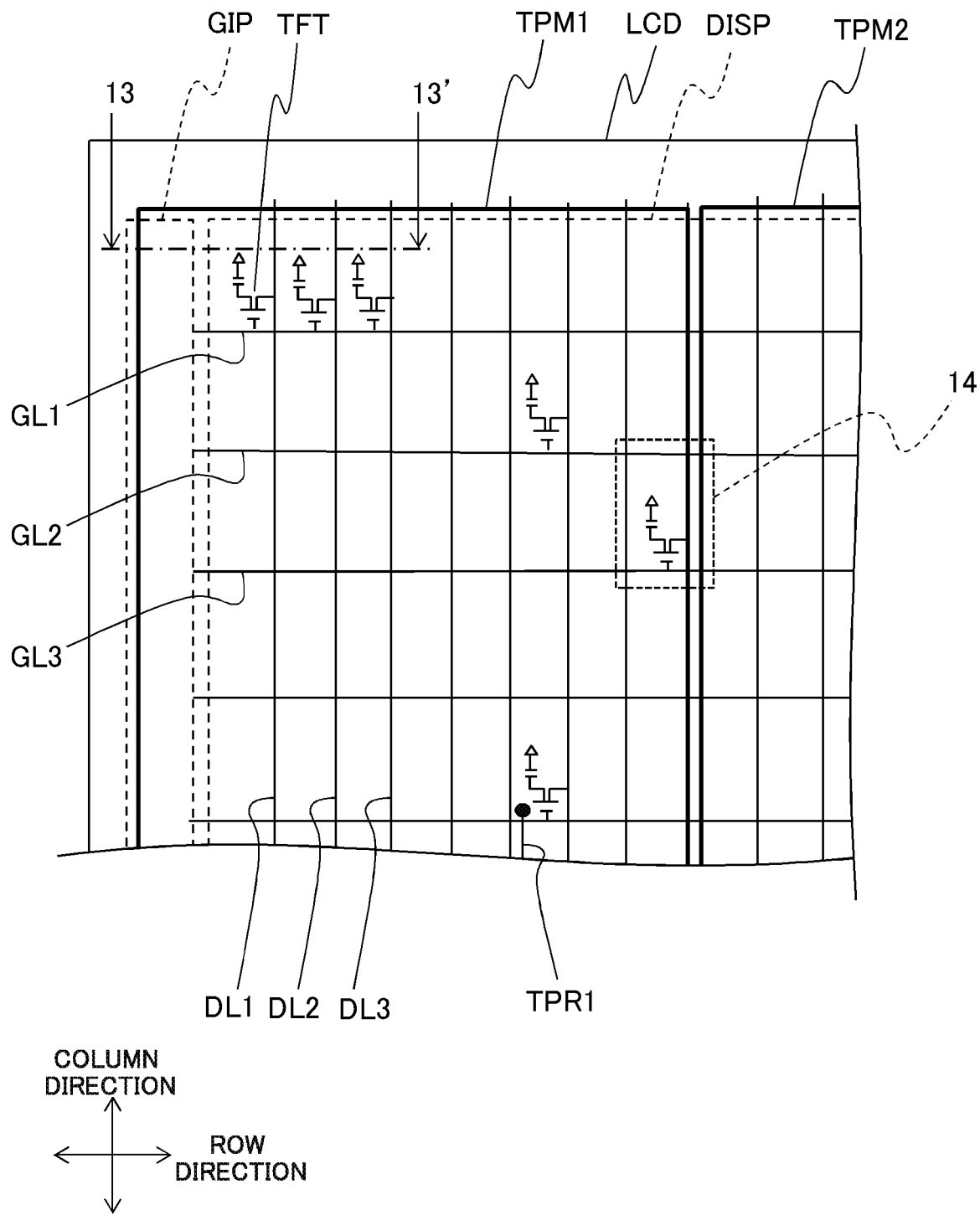
FIG. 12 is an enlarged plane view illustrating a range indicated by the sign "A" in FIG. 1 in liquid crystal display device LCD according to a second exemplary embodiment.

FIG. 12 is an enlarged plane view illustrating a range indicated by the sign "A" in FIG. 1 in liquid crystal display device LCD according to a second exemplary embodiment. In liquid crystal display device LCD of the second exemplary embodiment, mainly, compared to liquid crystal display device LCD of the first exemplary embodiment, transparent touch panel electrode TPDIT is formed below touch panel electrode TPD.

Figure 13:
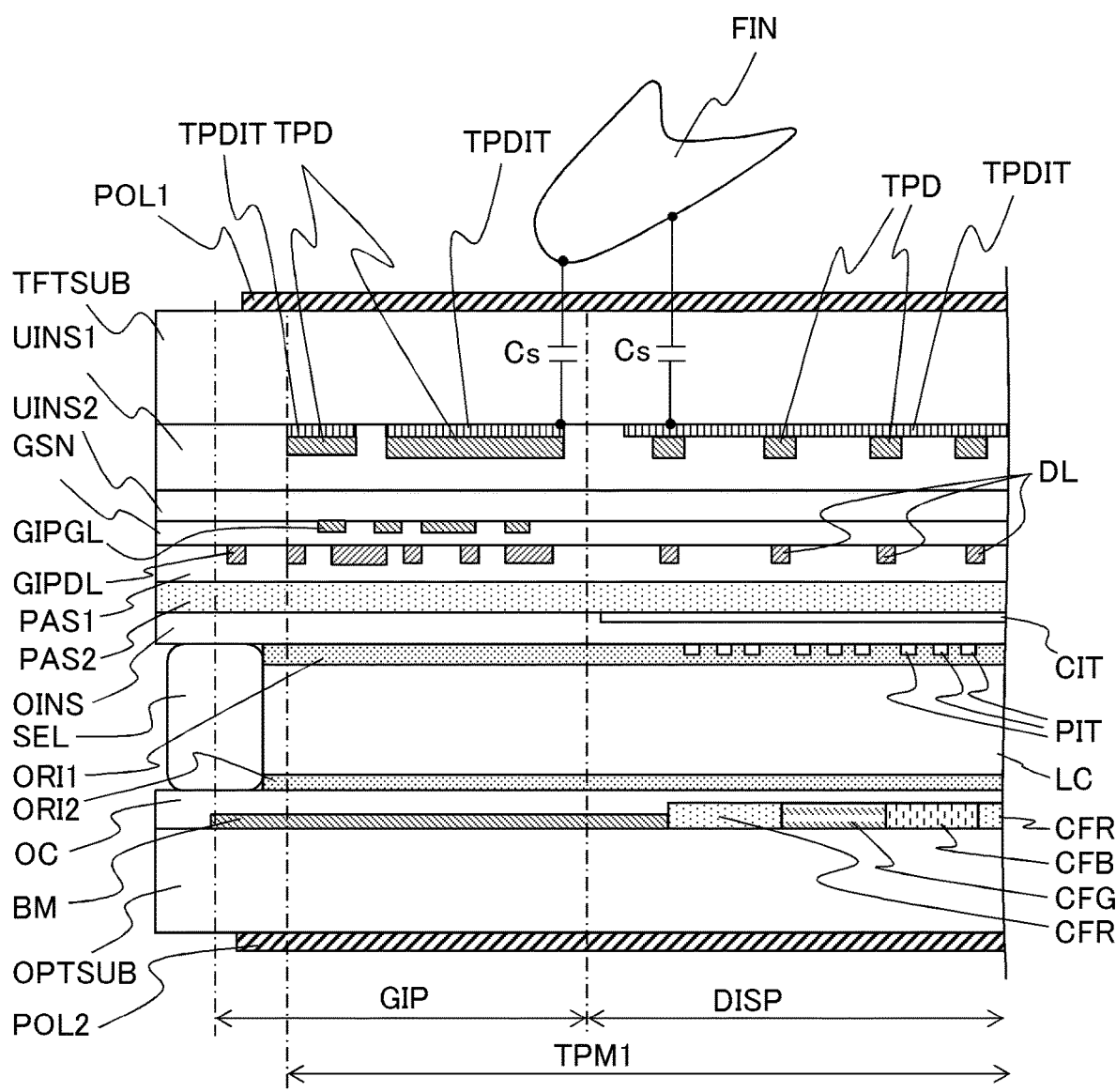
FIG. 13 is a sectional view of a part taken along line 13-13' in FIG. 12.

FIG. 13 is a sectional view of a part taken along line 13-13' in FIG. 12. FIG. 13 illustrates image display region DISP including three pixel regions and driving circuit region GIP. Transparent touch panel electrode TPDIT is formed on glass substrate TFTSUB constituting the TFT substrate, and touch panel electrode TPD is formed on transparent touch panel electrode TPDIT. That is, touch panel electrode is constructed with a laminated structure of metallic touch panel electrode TPD having the light shielding property and transparent touch panel electrode TPDIT. In image display region DISP, touch panel electrode TPD is disposed so as to cover data line DL and gate line GL, and acts as the black matrix. The opening ratio is not degraded because transparent touch panel electrode TPDIT is formed in the opening of the pixel region.

Figure 14:
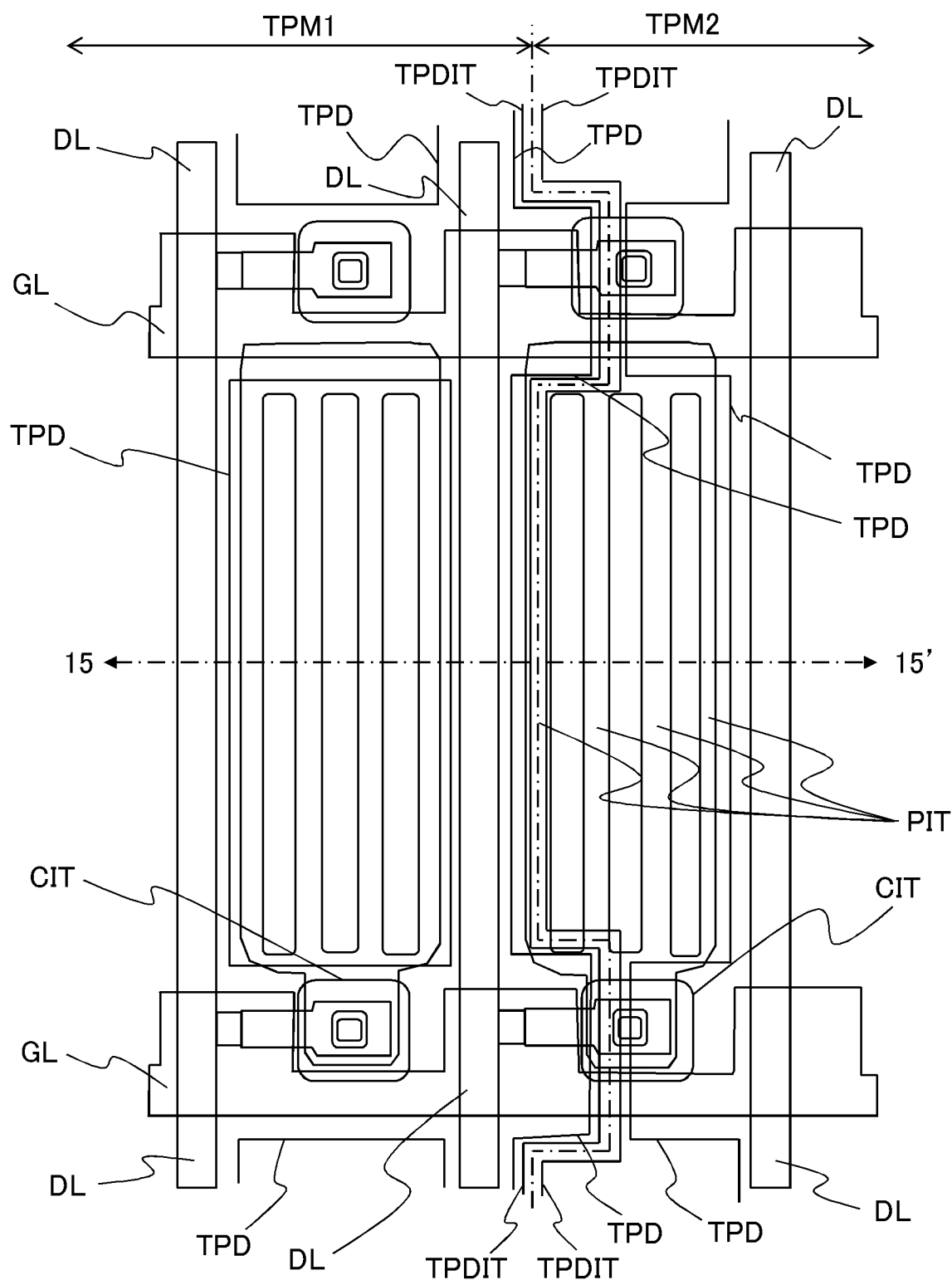
FIG. 14 is an enlarged plan view illustrating a range indicated by a sign "14" in FIG. 12.
Figure 15:
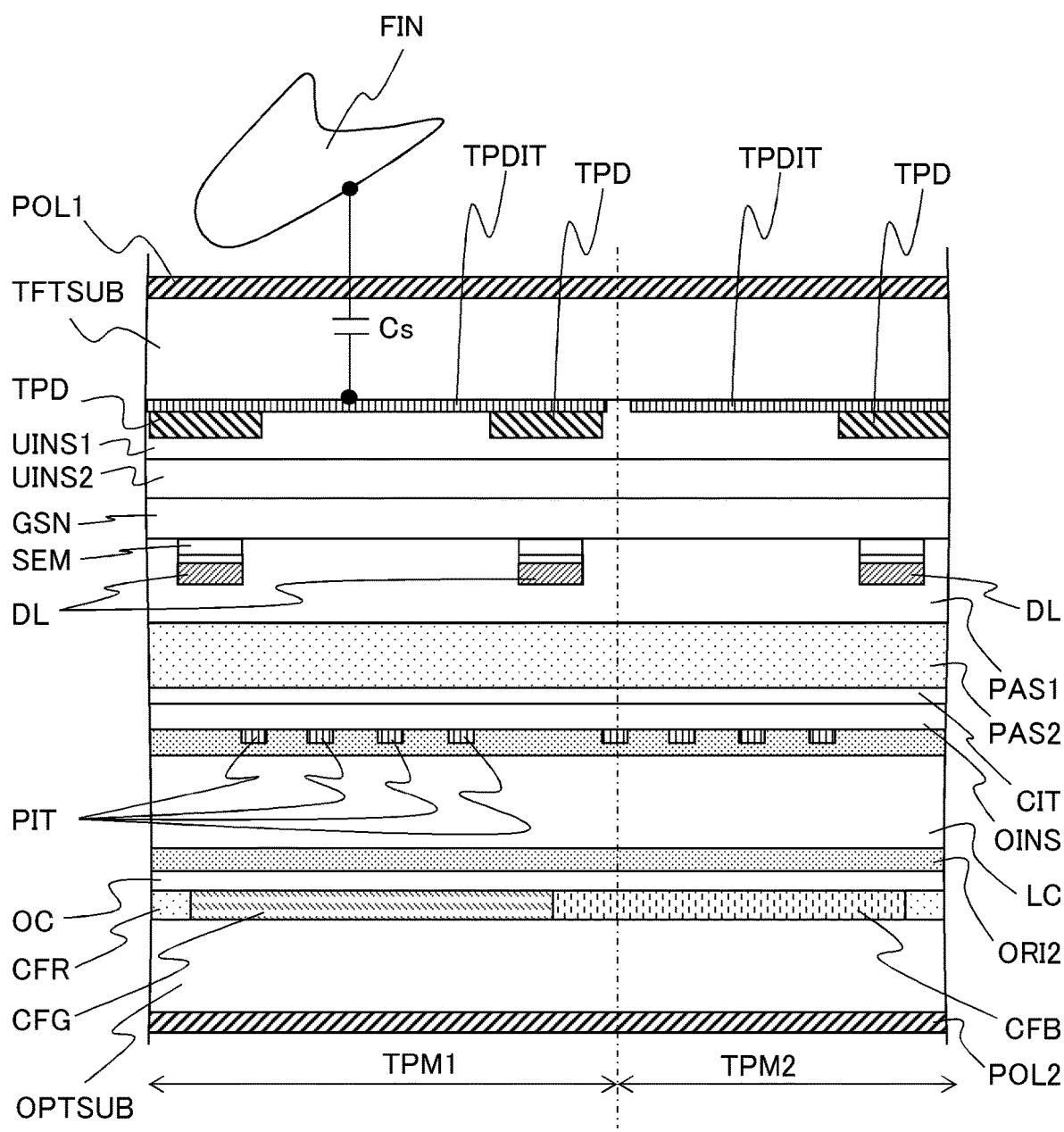
FIG. 15 is a sectional view of a part taken along line 15-15' in FIG. 14.

FIG. 14 is an enlarged plan view illustrating a range indicated by a sign "14" in FIG. 12. FIG. 15 is a sectional view of a part taken along line 15-15' in FIG. 14.

The boundary of two touch panel electrodes TPD adjacent to each other in the row direction is disposed at the position where the boundary does not overlap data line DL, and the boundary of two touch panel electrodes TPD adjacent to each other in the column direction is disposed at the position where the boundary does not overlap gate line GL. Similarly, the boundary of two transparent touch panel electrode TPDIT adjacent to each other in the row direction is disposed at the position where the boundary does not overlap data line DL, and the boundary of two transparent touch panel electrode TPDIT adjacent to each other in the column direction is disposed at the position where the boundary does not overlap gate line GL. That is, the boundary between first touch electrode region TPM1 and second touch electrode region TPM2 is disposed at a position deviating from a center of data line DL. Common electrode CIT is not divided in each touch electrode region TPM, but formed into one solid planar shape. Because the boundary portion of touch panel electrodes TPD, TPDIT is covered with common electrode CIT, the vicinity of the boundary of touch panel electrodes TPD, TPDIT can electrically be shielded, and the influence on display quality can be suppressed. In the configuration of the second exemplary embodiment, common electrode CIT acts as the electrode that displays the image but does not act as the electrode that detects the touch position.

Third Exemplary Embodiment

Figure 16:
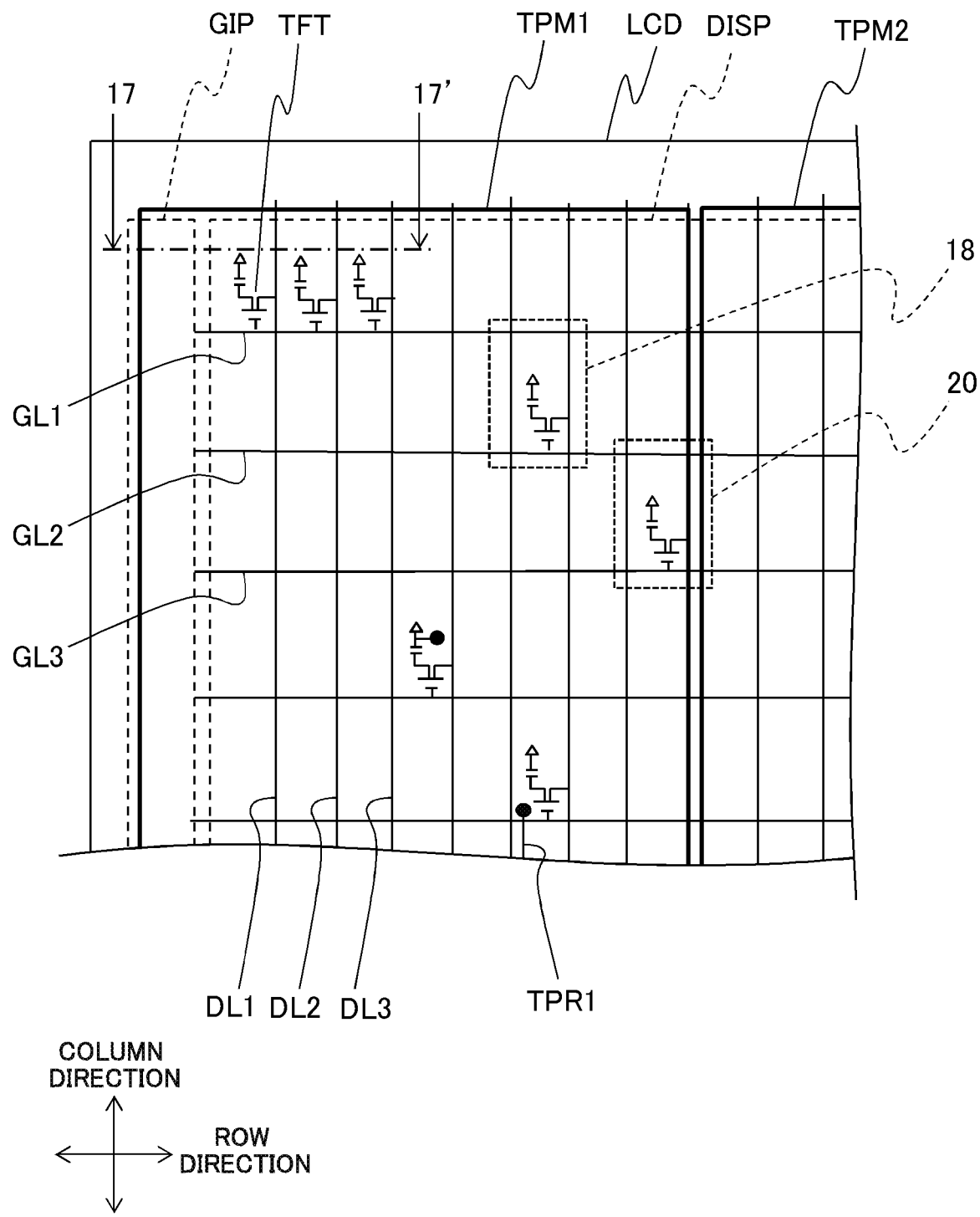
FIG. 16 is an enlarged plane view illustrating a range indicated by the sign "A" in FIG. 1 in liquid crystal display device LCD according to a third exemplary embodiment.

FIG. 16 is an enlarged plane view illustrating a range indicated by the sign "A" in FIG. 1 in liquid crystal display device LCD according to a third exemplary embodiment. In liquid crystal display device LCD of the third exemplary embodiment, mainly, compared to liquid crystal display device LCD of the first exemplary embodiment, liquid crystal display device LCD has a configuration of what is called a color filter-on-array (COA) in which color filters CFR, CFG, CFB are formed in the TFT substrate.

Figure 17:
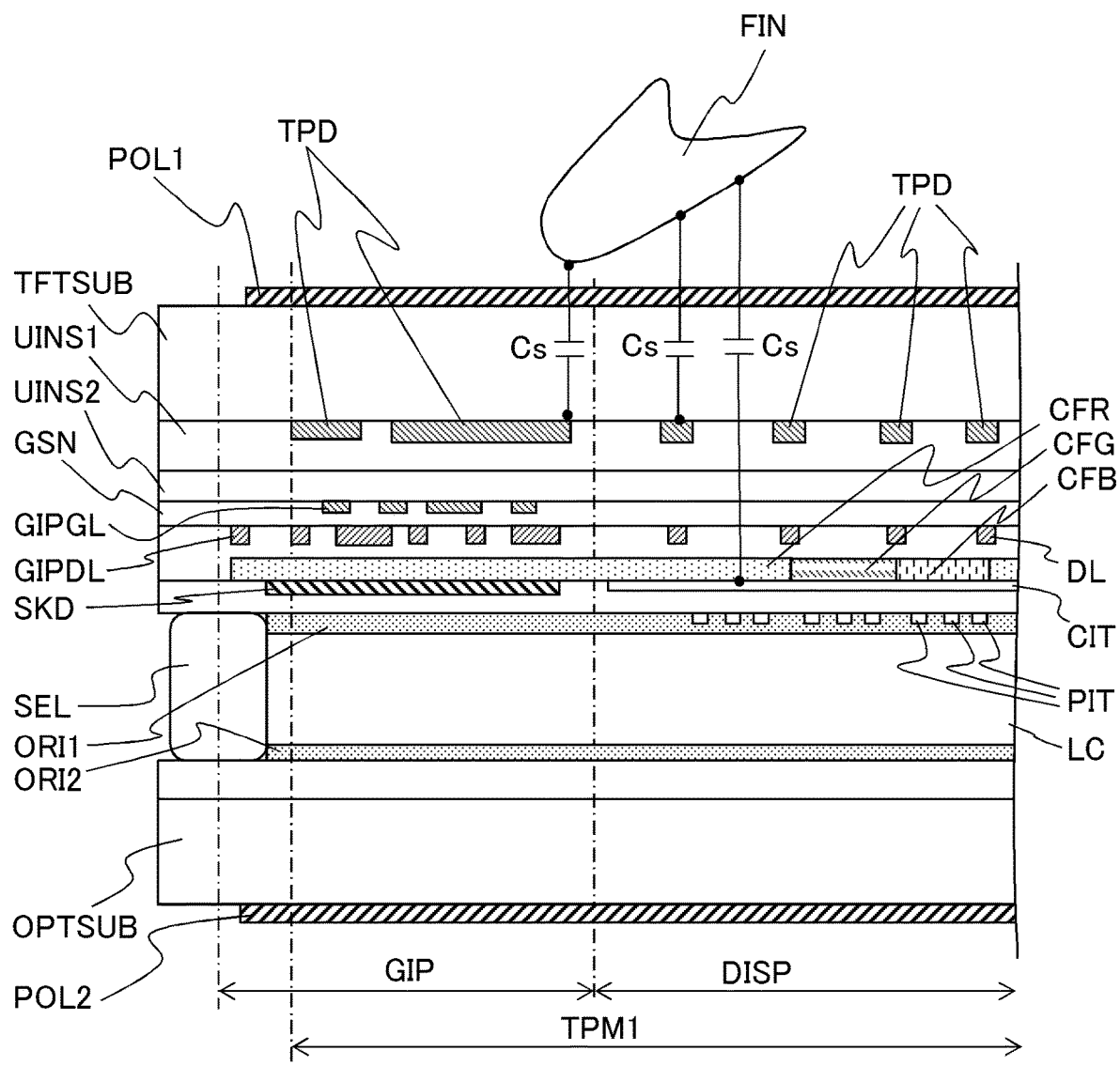
FIG. 17 is a sectional view of a part taken along line 17-17' in FIG. 16.

FIG. 17 is a sectional view of a part taken along line 17-17' in FIG. 16. In liquid crystal display device LCD of the third exemplary embodiment, color filters CFR, CFG, CFB and black matrix BM that plays a light shielding role in the pixel region are not formed in the CF substrate, but color filters CFR, CFG, CFB are disposed between data line DL and common electrode CIT of the TFT substrate. According to the configuration in FIG. 17, a fine pattern in which alignment with the TFT substrate is necessary is unnecessary in the CF substrate, so that generation of an error caused by the alignment between the TFT and CF substrates can be prevented. Therefore, the opening ratio can be increased.

Figure 18:
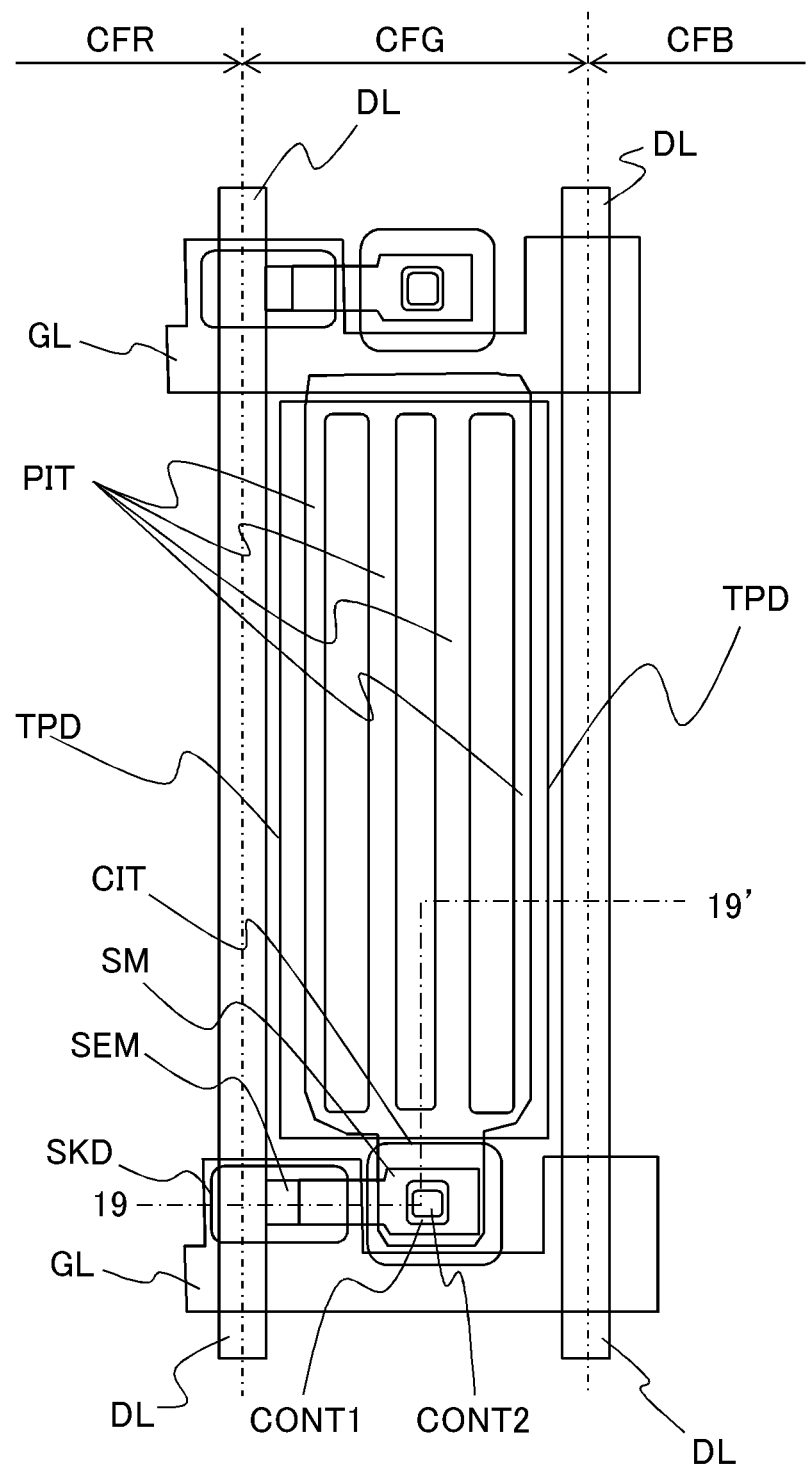
FIG. 18 is an enlarged plan view illustrating a range indicated by a sign "18" in FIG. 16.
Figure 19:
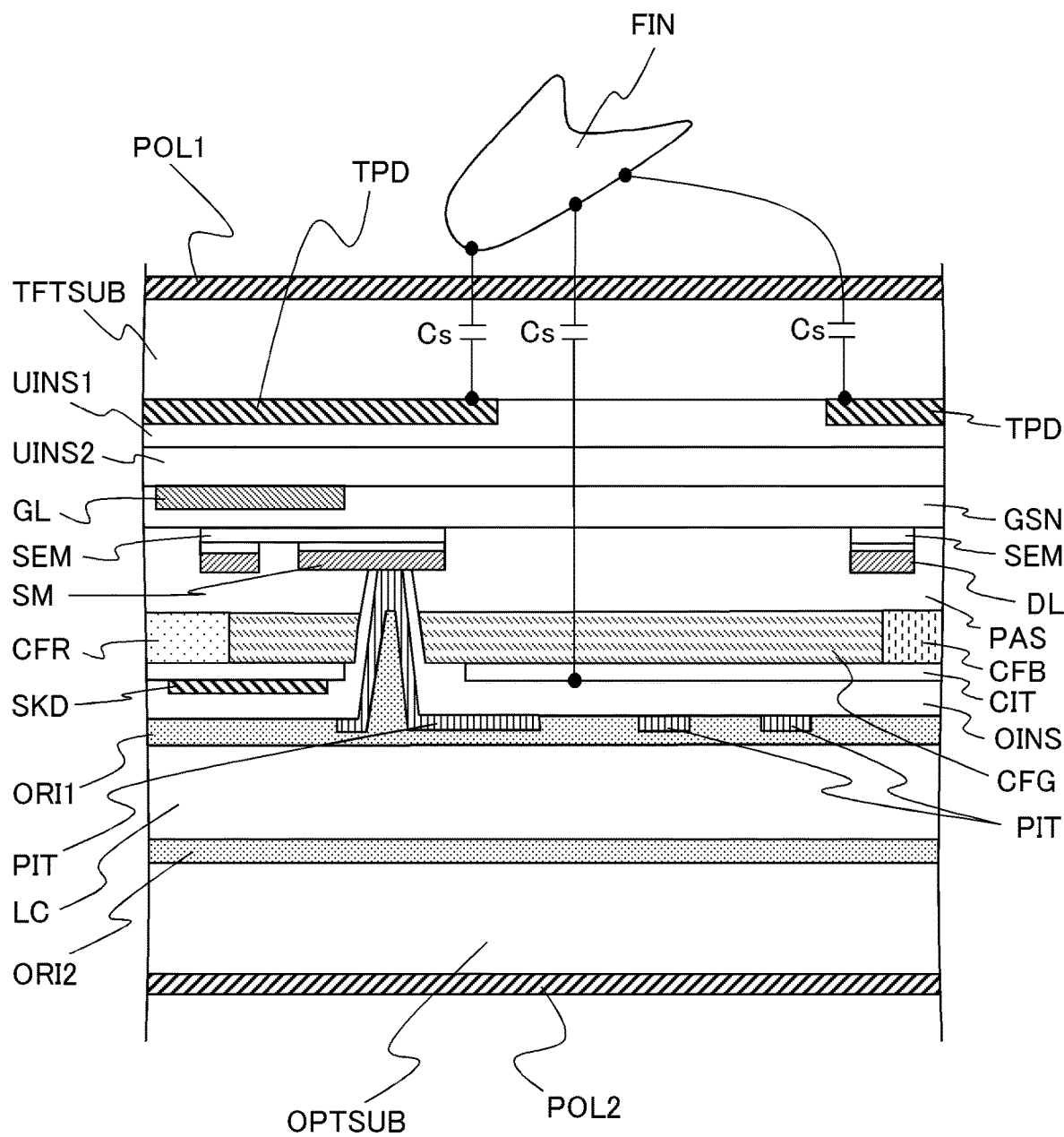
FIG. 19 is a sectional view of a part taken along line 19-19' in FIG. 18.

FIG. 18 is an enlarged plan view illustrating a range indicated by a sign "18" in FIG. 16. FIG. 19 is a sectional view of a part taken along line 19-19' in FIG. 18.

As illustrated in FIG. 18, boundaries of red color filter CFR, green color filter CFG, and blue color filter CFB, which are formed in the TFT substrate, are disposed in the column direction along data line DL. Because black matrix BM is not formed in image display region DISP of the CF substrate, light shielding electrode SKD is formed in the TFT substrate as the light shielding layer of thin film transistor TFT. Therefore, the light of the backlight can be prevented from being incident on semiconductor layer SEM of thin film transistor TFT.

As illustrated in FIG. 19, color filters CFR, CFG, CFB are formed between protective film PAS and common electrode CIT. A color mixing margin, in which light of adjacent pixels regions leaks due to position deviation and color deviates from original data, can be improved because the light shielding is performed in the boundary of each color filter by data line DL and touch panel electrode TPD. Light shielding electrode SKD is formed on common electrode CIT.

Figure 20:
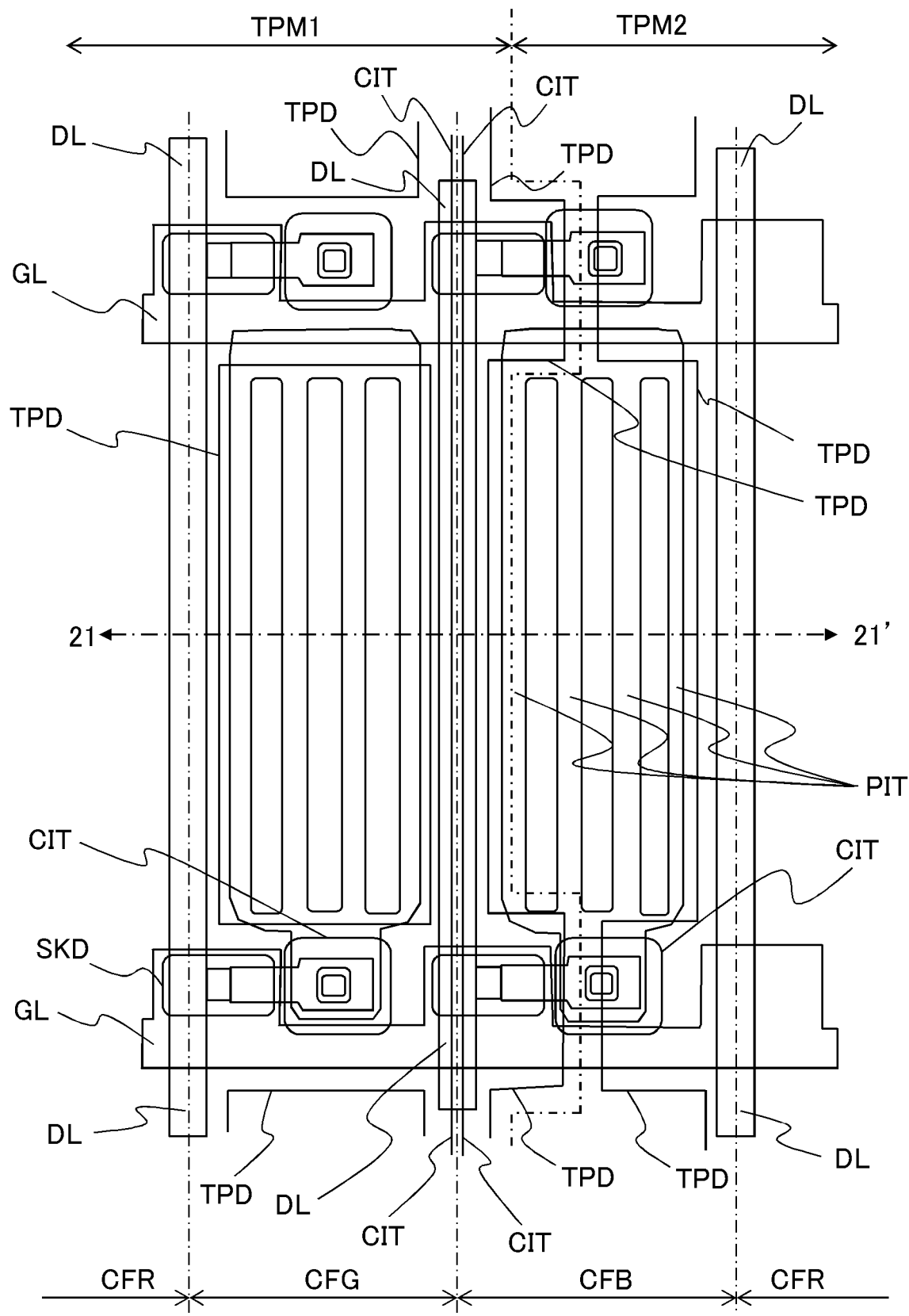
FIG. 20 is an enlarged plan view illustrating a range indicated by a sign "20" in FIG. 16.
Figure 21:
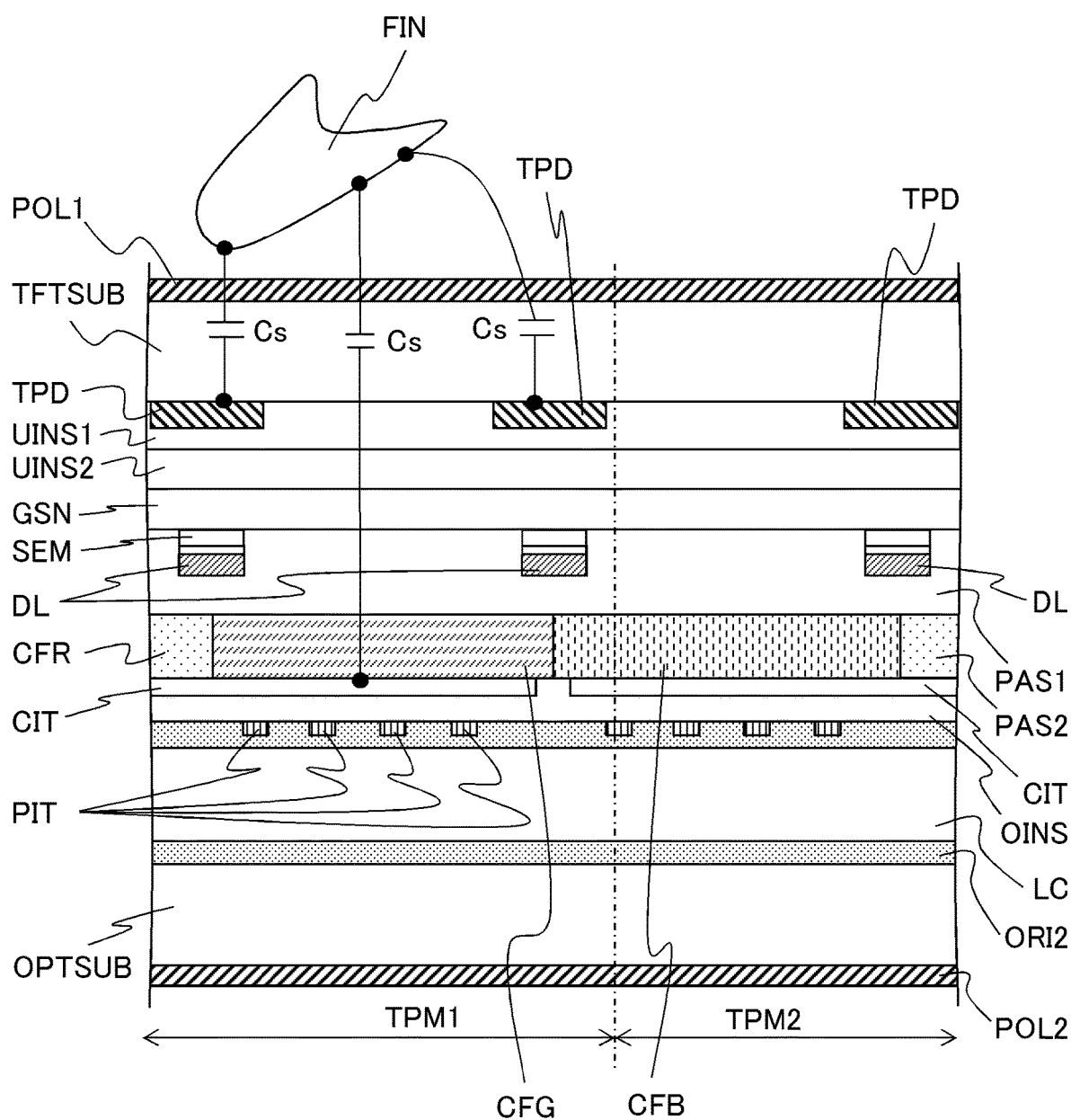
FIG. 21 is a sectional view of a part taken along line 21-21' in FIG. 20.

FIG. 20 is an enlarged plan view illustrating a range indicated by a sign "20" in FIG. 16. FIG. 21 is a sectional view of a part taken along line 21-21' in FIG. 20.

Each boundary of color filter CF is disposed in the column direction along data line DL. As illustrated in FIG. 20, the boundary of touch panel electrode TPD is disposed at the position deviating from data line DL, and covers the boundary of color filter CF and the boundary of common electrode CIT. As illustrated in FIG. 21, boundary of common electrode CIT is disposed on data line DL. Touch panel electrode TPD acts as the black matrix.

Fourth Exemplary Embodiment

Figure 22:
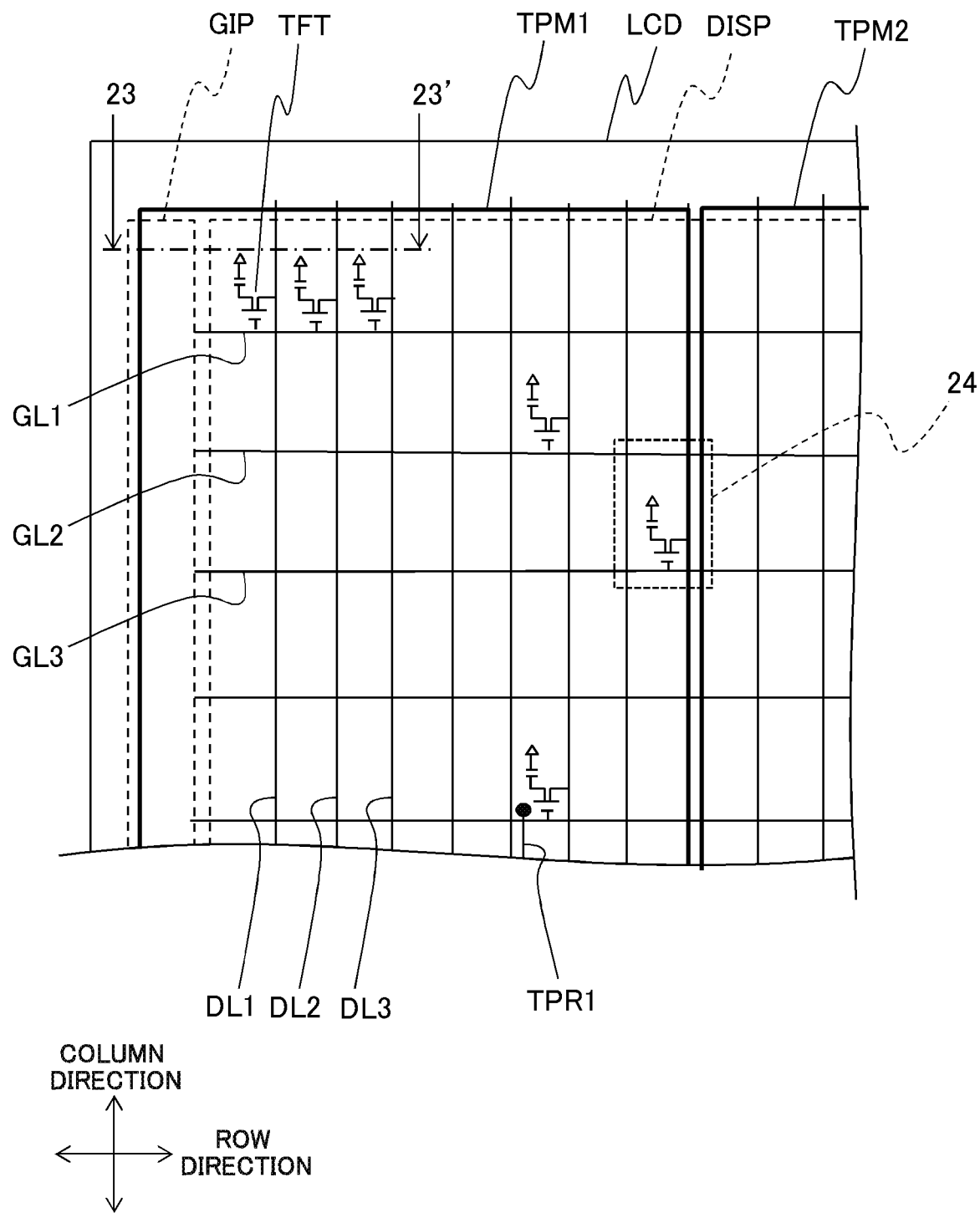
FIG. 22 is an enlarged plane view illustrating a range indicated by the sign "A" in FIG. 1 in liquid crystal display device LCD according to a fourth exemplary embodiment.

FIG. 22 is an enlarged plane view illustrating a range indicated by the sign "A" in FIG. 1 in liquid crystal display device LCD according to a fourth exemplary embodiment. In liquid crystal display device LCD of the fourth exemplary embodiment, mainly, compared to liquid crystal display device LCD of the first exemplary embodiment, transparent touch panel electrode TPDIT is formed below touch panel electrode TPD, and liquid crystal display device LCD has a configuration of what is called a color filter-on-array (COA) in which color filters CFR, CFG, CFB are formed in the TFT substrate.

Figure 23:
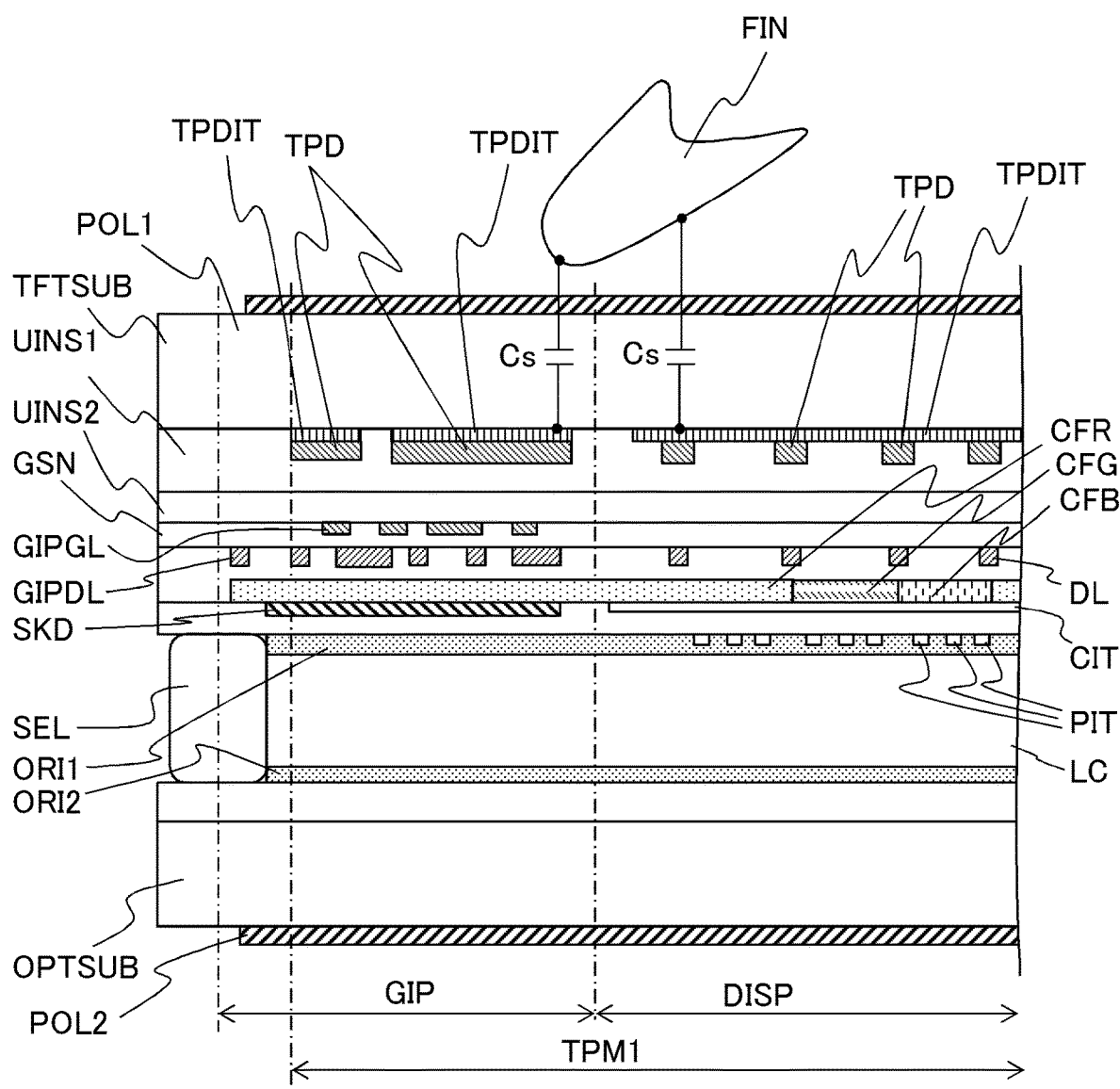
FIG. 23 is a sectional view of a part taken along line 23-23' in FIG. 22.
Figure 24:
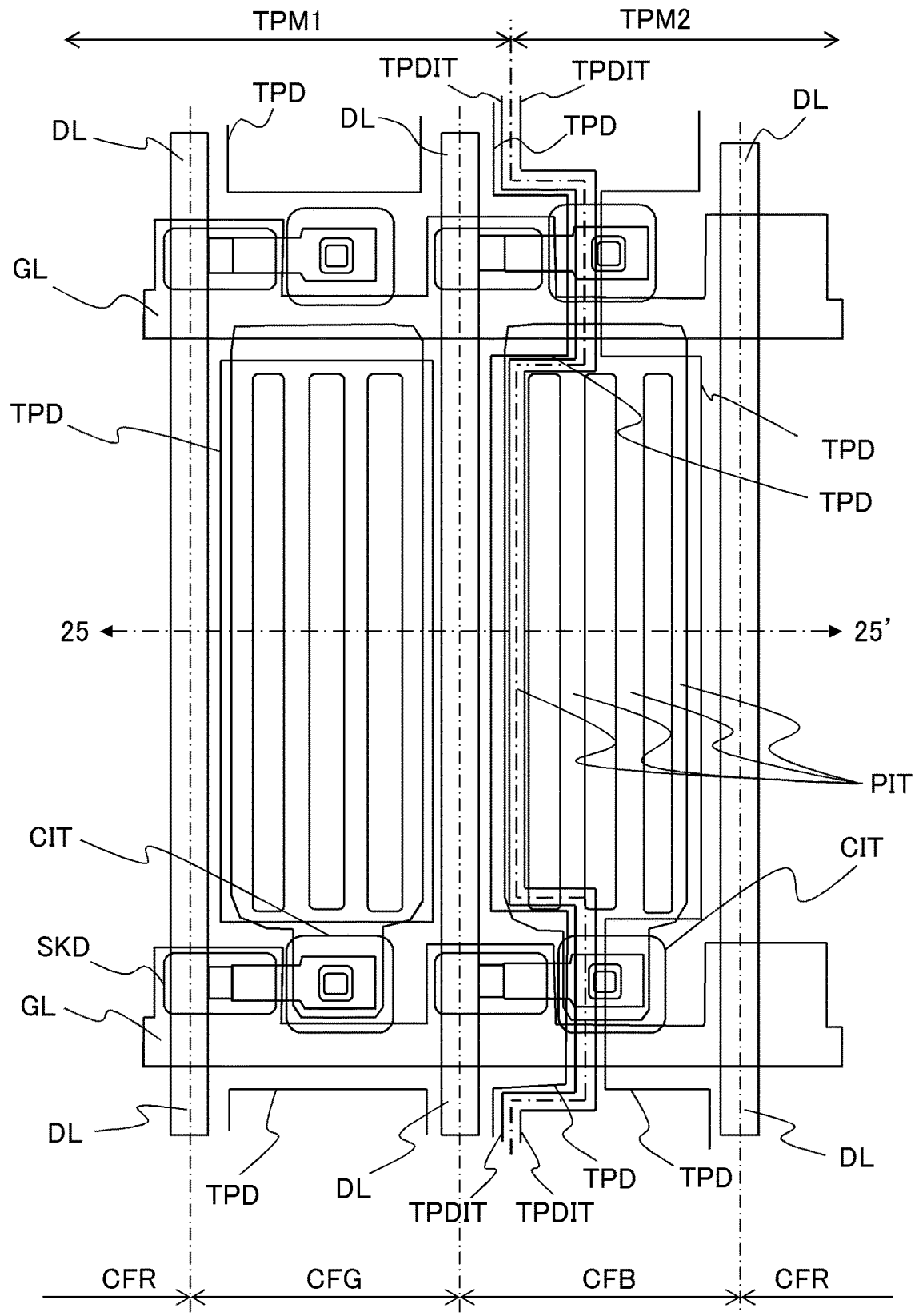
FIG. 24 is an enlarged plan view illustrating a range indicated by a sign "24" in FIG. 22.
Figure 25:
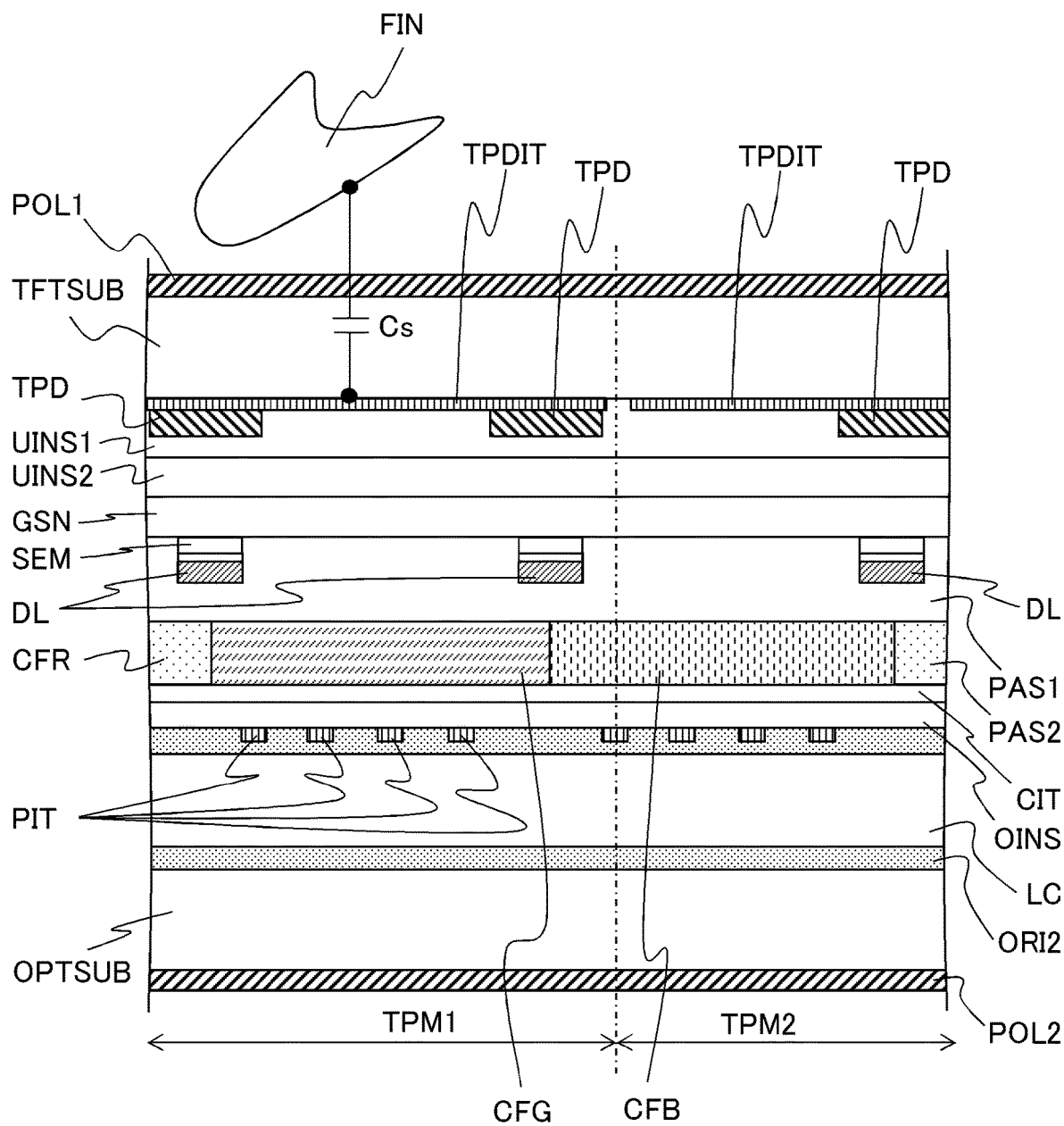
FIG. 25 is a sectional view of a part taken along line 25-25' in FIG. 24.

FIG. 23 is a sectional view of a part taken along line 23-23' in FIG. 22. FIG. 24 is an enlarged plan view illustrating a range indicated by a sign "24" in FIG. 22. FIG. 25 is a sectional view of a part taken along line 25-25' in FIG. 24. Transparent touch panel electrode TPDIT has a configuration similar to that of liquid crystal display device LCD of the second exemplary embodiment, and color filters CFR, CFG, CFB have a configuration similar to that of liquid crystal display device LCD of the third exemplary embodiment. In the liquid crystal display device LCD of the fourth exemplary embodiment, the effect similar to that of liquid crystal display device LCD of the second and third exemplary embodiments can be obtained.

Fifth Exemplary Embodiment

Figure 26:
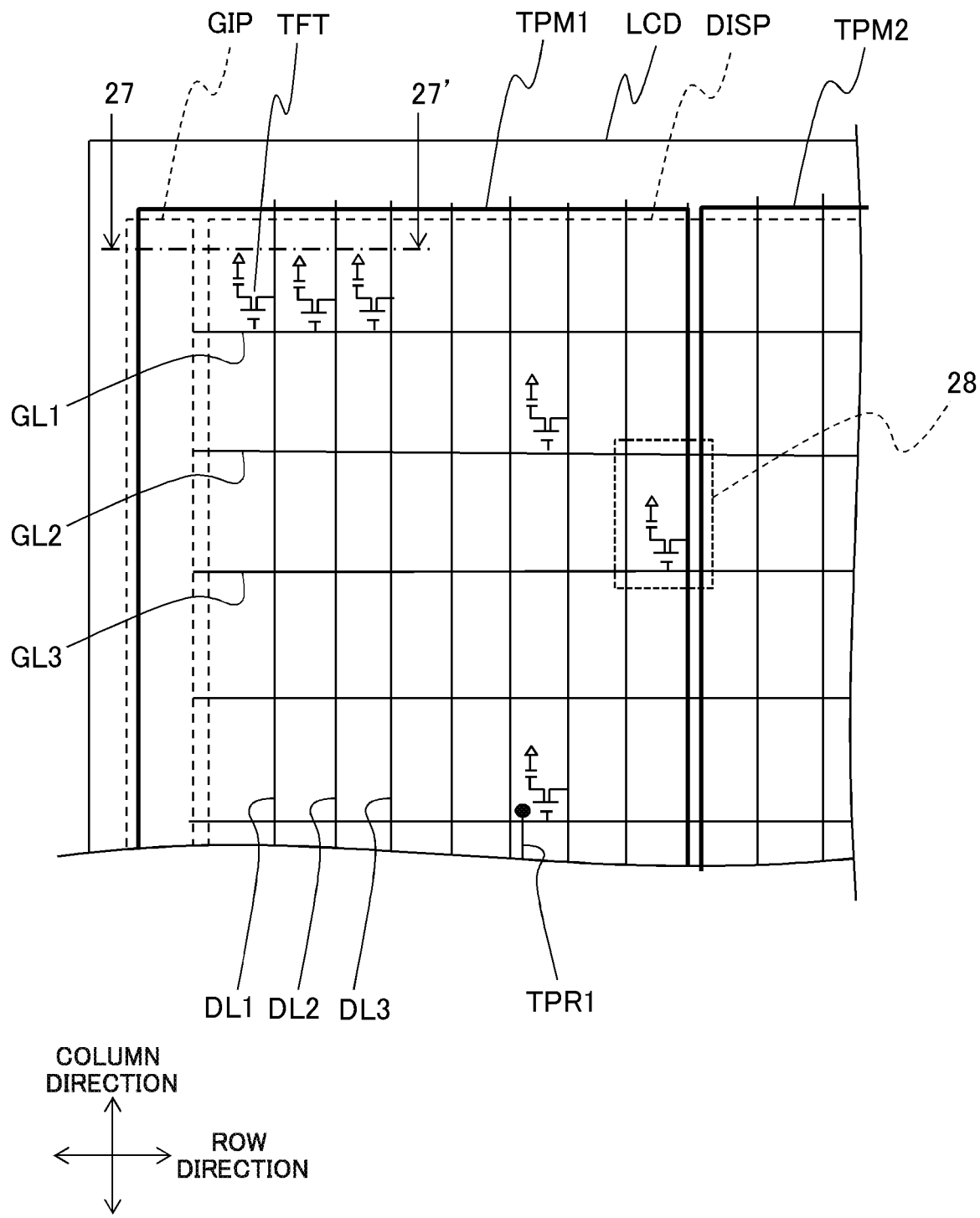
FIG. 26 is an enlarged plane view illustrating a range indicated by the sign "A" in FIG. 1 in liquid crystal display device LCD according to a fifth exemplary embodiment.

FIG. 26 is an enlarged plane view illustrating a range indicated by the sign "A" in FIG. 1 in liquid crystal display device LCD according to a fifth exemplary embodiment. In liquid crystal display device LCD of the fifth exemplary embodiment, mainly, compared to liquid crystal display device LCD of the second exemplary embodiment, touch panel electrode TPD is eliminated.

Figure 27:
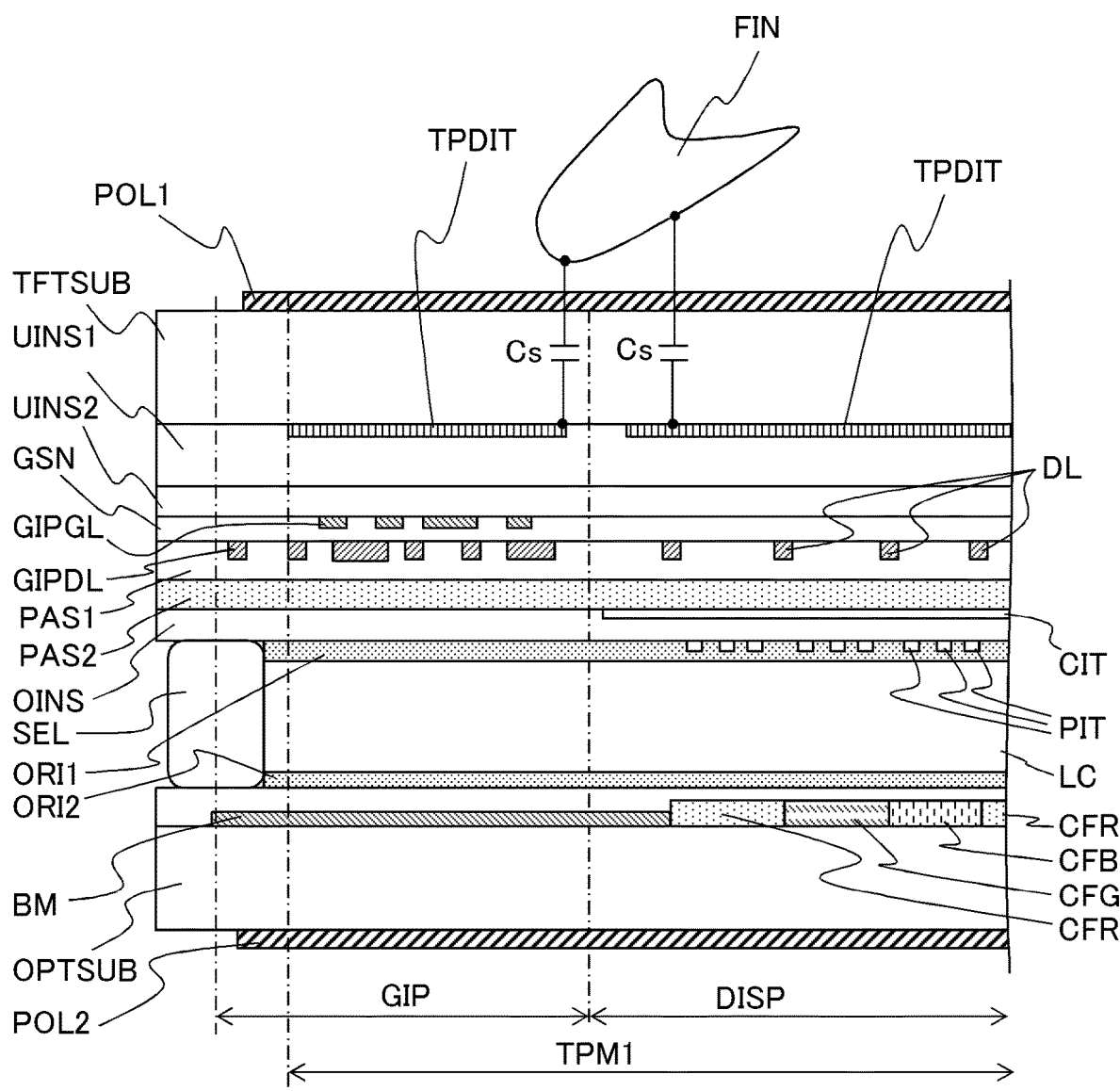
FIG. 27 is a sectional view of a part taken along line 27-27' in FIG. 26.
Figure 28:
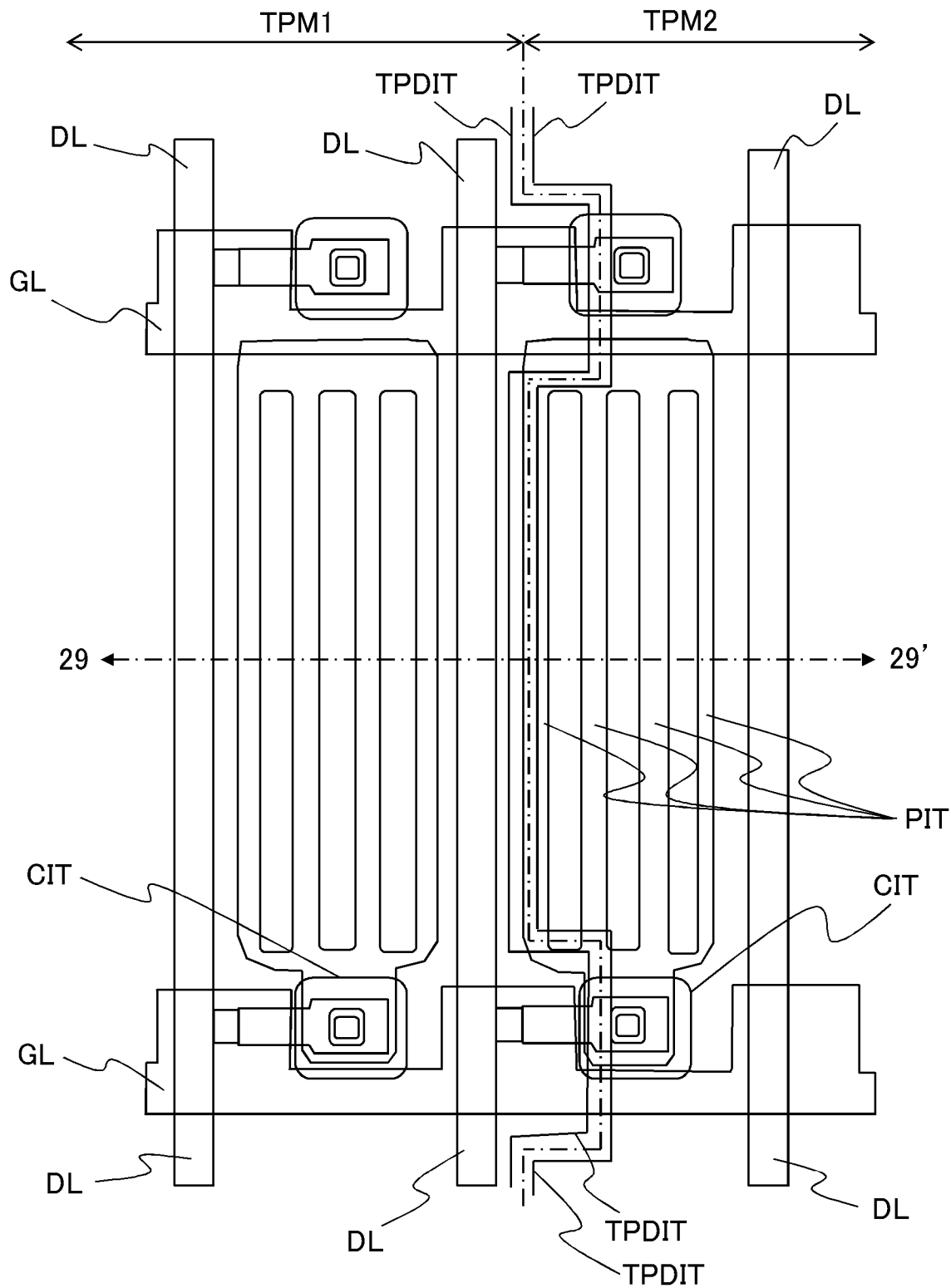
FIG. 28 is an enlarged plan view illustrating a range indicated by a sign "28" in FIG. 26.
Figure 29:
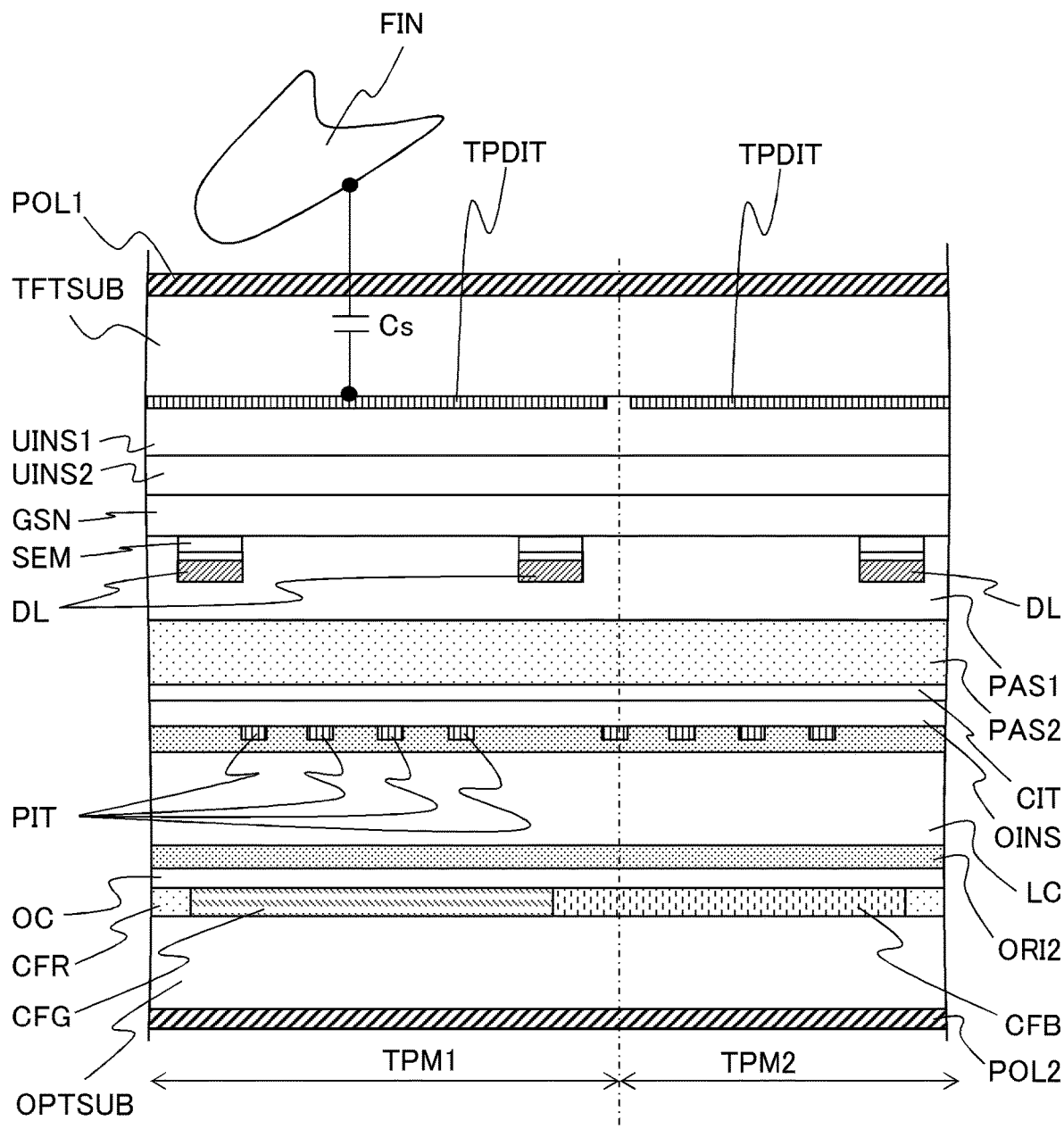
FIG. 29 is a sectional view of a part taken along line 29-29' in FIG. 26.

FIG. 27 is a sectional view of a part taken along line 27-27' in FIG. 26. FIG. 28 is an enlarged plan view illustrating a range indicated by a sign "28" in FIG. 26. FIG. 29 is a sectional view of a part taken along line 29-29' in FIG. 28. In liquid crystal display device LCD of the fifth exemplary embodiment, the touch panel electrode is constructed only with transparent touch panel electrode TPDIT. Therefore, a manufacturing process can be simplified, and thus cost reduction can be achieved. Because transparent touch panel electrode TPDIT has a resistance higher than that of touch panel electrode TPD, transparent touch panel electrode TPDIT is suitable for a liquid crystal display device having a small screen size. In the fifth exemplary embodiment, because metallic touch panel electrode TPD is eliminated, the boundary of the pixel region and the boundary of the color filter CF are disposed at the position overlapping data line DL. Other configurations are similar to those of liquid crystal display device LCD of the second exemplary embodiment.

Sixth Exemplary Embodiment

Figure 30:
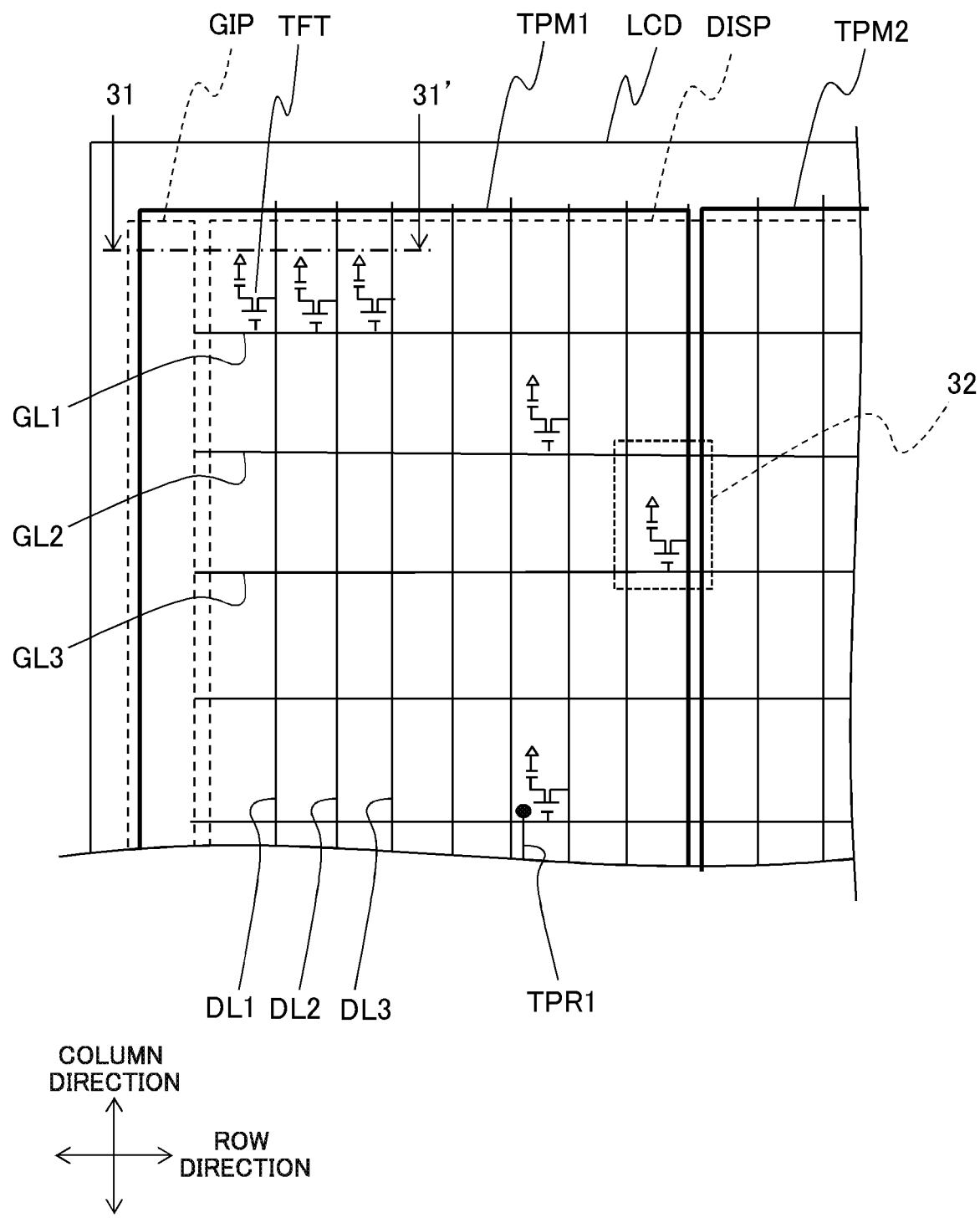
FIG. 30 is an enlarged plane view illustrating a range indicated by the sign "A" in FIG. 1 in liquid crystal display device LCD according to a sixth exemplary embodiment.

FIG. 30 is an enlarged plane view illustrating a range indicated by the sign "A" in FIG. 1 in liquid crystal display device LCD according to a sixth exemplary embodiment. In liquid crystal display device LCD of the sixth exemplary embodiment, mainly, compared to liquid crystal display device LCD of the fourth exemplary embodiment, touch panel electrode TPD is eliminated.

Figure 31:
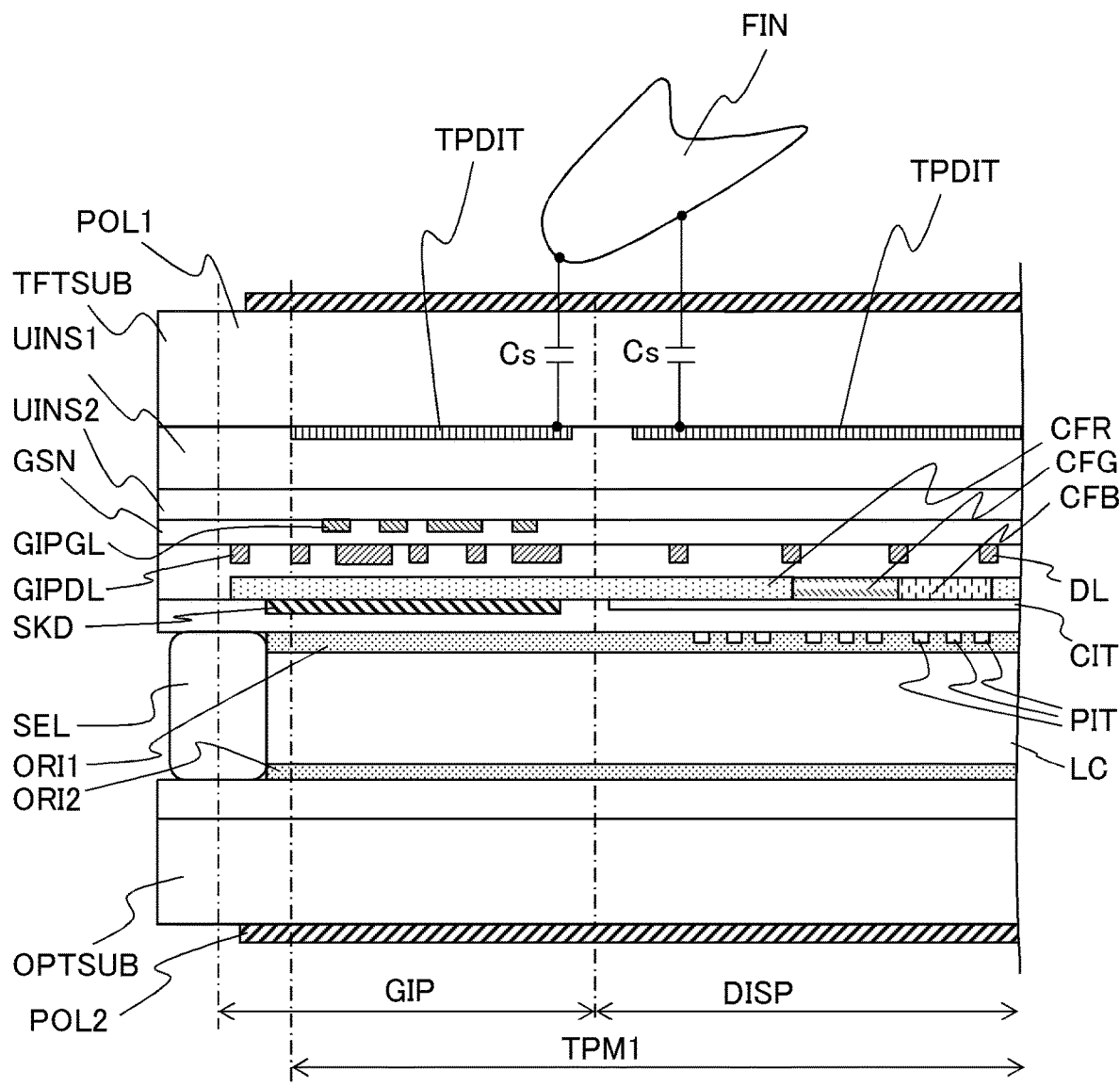
FIG. 31 is a sectional view of a part taken along line 31-31' in FIG. 30.
Figure 32:
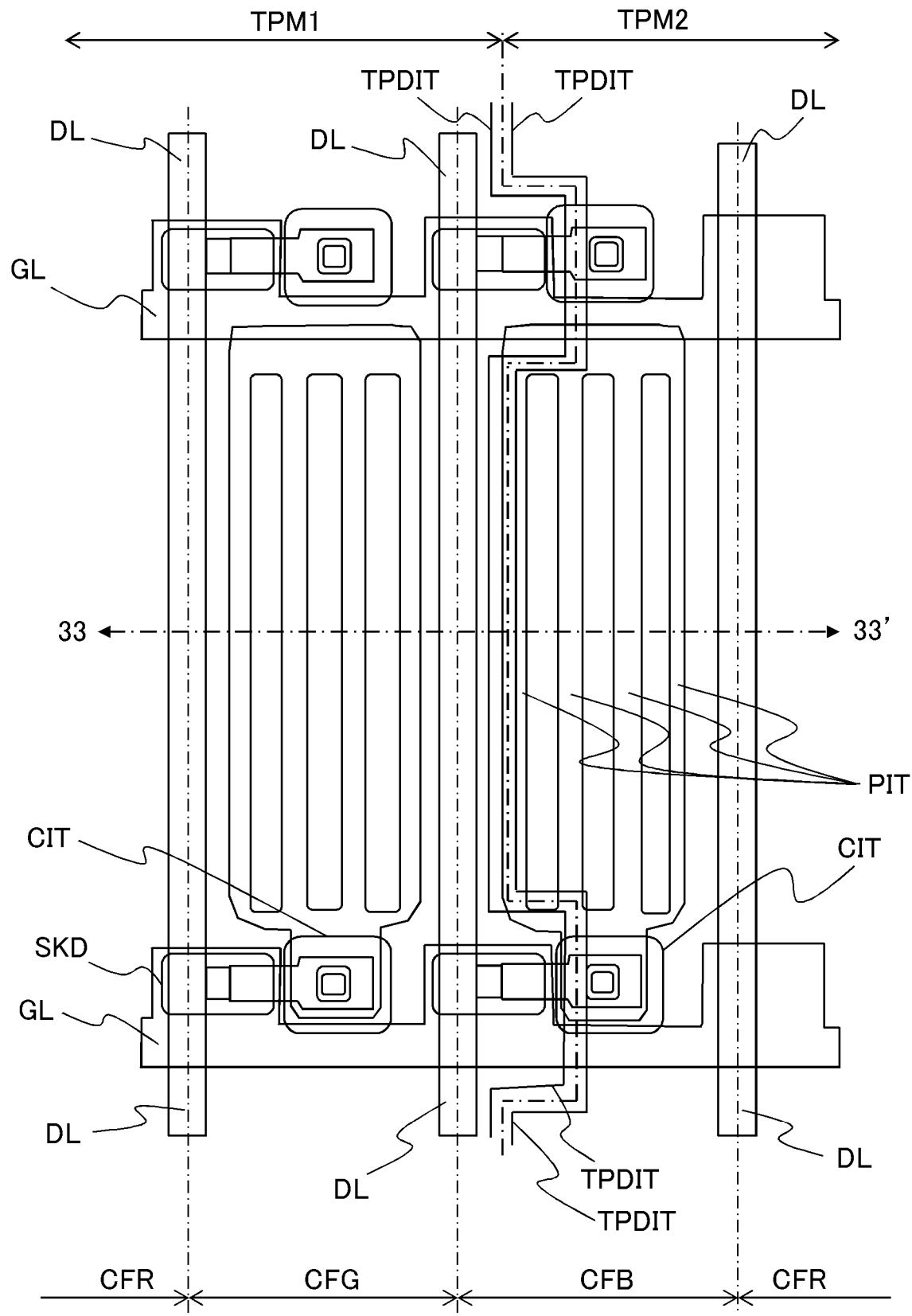
FIG. 32 is an enlarged plan view illustrating a range indicated by a sign "32" in FIG. 30.
Figure 33:
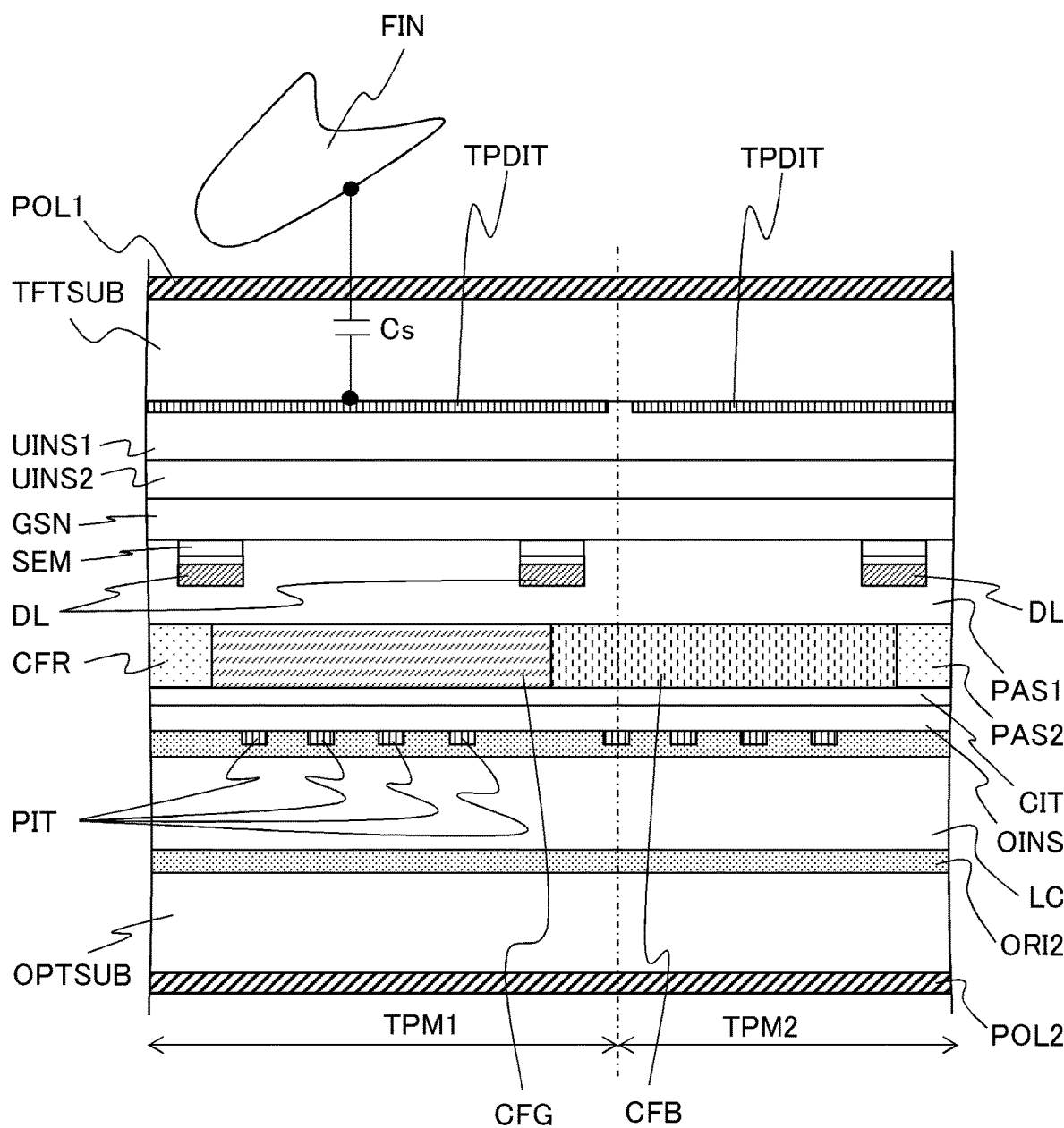
FIG. 33 is a sectional view of a part taken along line 33-33' in FIG. 32.

FIG. 31 is a sectional view of a part taken along line 31-31' in FIG. 30. FIG. 32 is an enlarged plan view illustrating a range indicated by a sign "32" in FIG. 30. FIG. 33 is a sectional view of a part taken along line 33-33' in FIG. 32. In liquid crystal display device LCD of the sixth exemplary embodiment, the touch panel electrode is constructed only with transparent touch panel electrode TPDIT. Therefore, the manufacturing process can be simplified, and thus the cost reduction can be achieved. Because transparent touch panel electrode TPDIT has a resistance higher than that of touch panel electrode TPD, transparent touch panel electrode TPDIT is suitable for a liquid crystal display device having a small screen size. In the sixth exemplary embodiment, because metallic touch panel electrode TPD is eliminated, the boundary of the pixel region and the boundary of the color filter CF are disposed at the position overlapping data line DL. Other configurations are similar to those of liquid crystal display device LCD of the fourth exemplary embodiment.

Seventh Exemplary Embodiment

Figure 34:
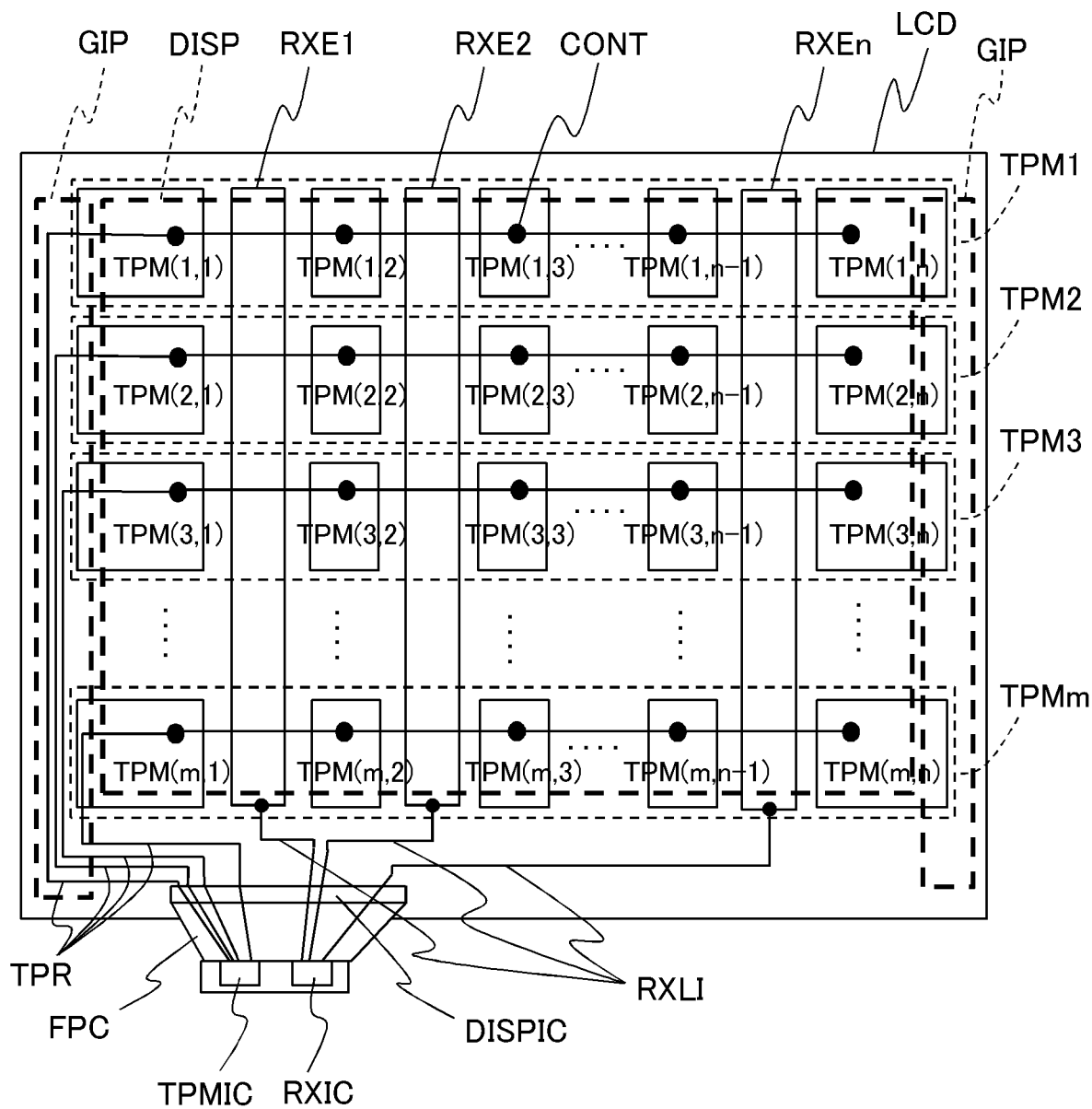
FIG. 34 is an enlarged plane view illustrating a range indicated by the sign "A" in FIG. 1 in liquid crystal display device LCD according to a seventh exemplary embodiment.

FIG. 34 is a plan view schematically illustrating an entire configuration of liquid crystal display device LCD according to a seventh exemplary embodiment. Liquid crystal display device LCD of FIG. 1 has the configuration of the self-capacitance type. However, the present disclosure is not limited to the self-capacitance type, but may have a configuration of a mutual capacitance type. Liquid crystal display device LCD of the seventh exemplary embodiment has the configuration of the mutual capacitance type. For example, when conductor FIN such as a finger comes close, the change in electrostatic capacitance between touch panel electrode or touch electrode region TPM and the electrode in detection electrode region RXE is sensed to detect the coordinate of the touch position. Touch panel driving wiring TPR connected to the touch panel electrode is connected to touch electrode driver TPMIC, and detection electrode driving wiring RXLI connected to detection electrode region RXE is connected to detection electrode driver RXIC.

In the seventh exemplary embodiment, the touch panel electrode, touch electrode region TPM, detection electrode region RXE extends to not only image display region DISP but also the peripheral region including driving circuit region GIP. Therefore, sensing ability of a command displayed at an end of image display region DISP can be improved because the touch position can be detected even in the peripheral region. The sectional configurations of the first to sixth exemplary embodiments can be adopted to the sectional configuration of liquid crystal display device LCD of the seventh exemplary embodiment.

Liquid crystal display device LCD of the above exemplary embodiments has the IPS scheme configuration. However, the liquid crystal display device of the present disclosure is not limited to the IPS scheme configuration. For example, common electrode CIT that displays the image may be formed in the CF substrate. Pixel electrode PIT and common electrode CIT may be formed in an identical layer of the TFT substrate.

In the TFT substrate, common electrode CIT may be disposed on the side of liquid crystal layer LC with respect to pixel electrode PIT. In this case, the slit is formed in common electrode CIT, and pixel electrode PIT may be formed into the solid planar shape in the pixel region. This configuration is suitable for the configuration in which transparent touch panel electrode TPDIT is disposed below touch panel electrode TPD.

Liquid crystal display device LCD of each exemplary embodiment can be manufactured by adopting a known method. For example, touch panel electrode TPD made of the metallic material can be formed by a method similar to the method for forming black matrix BM.

While there have been described what are at present considered to be certain embodiments of the application, it will be understood that various modifications may be made thereto, and it is intended that the appended claims cover all such modifications as fall within the true spirit and scope of the invention.

What is claimed is:

1. A display device with a touch detection function comprising:
   a first substrate including a plurality of gate lines, a plurality of data lines, a plurality of pixel electrodes, and a plurality of touch sensor electrodes; and
   a second substrate that is disposed opposite the first substrate,
   wherein
   the first substrate is disposed on a touch operation side with respect to the second substrate,
   a part of the plurality of touch sensor electrodes is disposed in a peripheral region located outside an image display region,
   the plurality of touch sensor electrodes include a plurality of first touch sensor electrodes made of a metallic material having a light shielding property and a plurality of second touch sensor electrodes made of a transparent electrode material,
   in planar view, the plurality of first touch sensor electrodes are disposed so as to overlap the plurality of gate lines and the plurality of data lines, and an opening is formed at a position overlapping the plurality of pixel electrodes, and
   in planar view, each of the second touch sensor electrodes is disposed so as to cover each of the first touch sensor electrodes.

2. A display device with a touch detection function comprising:
   a first substrate including a plurality of gate lines, a plurality of data lines, a plurality of pixel electrodes, and a plurality of touch sensor electrodes; and
   a second substrate that is disposed opposite the first substrate,
   wherein
   the first substrate is disposed on a touch operation side with respect to the second substrate,
   a part of the plurality of touch sensor electrodes is disposed in a peripheral region located outside an image display region,
   the plurality of touch sensor electrodes are formed on a glass substrate in the image display region and the peripheral region,
   a first insulator is formed so as to cover the plurality of touch sensor electrodes,
   the plurality of gate lines are formed on the first insulator,
   a second insulator is formed so as to cover the plurality of gate lines,
   the plurality of data lines are formed on the second insulator,
   a third insulator is formed so as to cover the plurality of data lines, and
   the plurality of pixel electrodes are formed on the third insulator.

3. The display device with the touch detection function according to claim 2, wherein a plurality of lead lines electrically connected to the plurality of gate lines are formed on the first insulator in the peripheral region.

* * * * *